(12) United States Patent
Wu et al.

(10) Patent No.: US 11,765,769 B2
(45) Date of Patent: Sep. 19, 2023

(54) SUPPLEMENTAL POSITIONING REFERENCE SIGNAL TRANSMISSION

(71) Applicant: QUALCOMM Incorporated, San Diego, CA (US)

(72) Inventors: Shuanshuan Wu, San Diego, CA (US); Arthur Gubeskys, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/389,855

(22) Filed: Jul. 30, 2021

(65) Prior Publication Data

US 2023/0030759 A1 Feb. 2, 2023

(51) Int. Cl.

| | |
|---|---|
| *H04W 74/08* | (2009.01) |
| *H04W 74/00* | (2009.01) |
| *H04W 4/02* | (2018.01) |
| *H04L 5/00* | (2006.01) |
| *H04W 72/54* | (2023.01) |
| *H04W 16/14* | (2009.01) |

(52) U.S. Cl.
CPC ....... *H04W 74/0808* (2013.01); *H04L 5/0048* (2013.01); *H04W 4/02* (2013.01); *H04W 72/54* (2023.01); *H04W 74/002* (2013.01); *H04W 16/14* (2013.01)

(58) Field of Classification Search
CPC ... H04W 74/0808; H04W 72/54; H04W 4/02; H04W 74/002; H04W 16/14; H04W 64/006; H04W 24/10; H04W 72/0446; H04W 64/00; H04L 5/0048; H04L 5/0053; H04L 5/0051; G01S 13/222
See application file for complete search history.

(56) References Cited

U.S. PATENT DOCUMENTS

| | | | |
|---|---|---|---|
| 2015/0263837 A1* | 9/2015 | Patel | H04W 72/0453 370/329 |
| 2017/0041912 A1* | 2/2017 | Tanaka | H04W 72/23 |
| 2018/0054792 A1* | 2/2018 | Lee | H04B 17/24 |

(Continued)

FOREIGN PATENT DOCUMENTS

| | | | | |
|---|---|---|---|---|
| CN | 108293172 B | * | 11/2021 | G01S 13/222 |
| WO | WO-2022233425 A1 | * | 11/2022 | |

*Primary Examiner* — Ayaz R Sheikh
*Assistant Examiner* — Louis Samara
(74) *Attorney, Agent, or Firm* — Holland & Hart LLP

(57) ABSTRACT

Methods, systems, and devices for wireless communications are described. A first user equipment (UE) may be configured to transmit positioning reference signals (PRSs) to a second UE in an unshared radio frequency spectrum and transmit supplemental PRSs to the second UE in a shared spectrum. The second UE may then use the supplemental PRSs in addition to the PRSs in the unshared spectrum to compute a position of the first UE. In some cases, the first UE may signal a configuration for the supplemental PRSs to the second UE, and, in other cases, a base station may signal the configuration for the supplemental PRSs to the second UE. In any case, because the second UE may use both the PRSs in the unshared spectrum and the supplemental PRSs to compute the position of the first UE, the accuracy of the computed position of the first UE may be improved.

28 Claims, 10 Drawing Sheets

(56) References Cited

U.S. PATENT DOCUMENTS

| | | | |
|---|---|---|---|
| 2018/0160389 A1* | 6/2018 | Yerramalli | H04W 24/10 |
| 2021/0083830 A1* | 3/2021 | Yerramalli | H04L 5/0053 |
| 2021/0185632 A1* | 6/2021 | Manolakos | H04L 5/0094 |
| 2021/0306979 A1 | 9/2021 | Choi et al. | |
| 2021/0360578 A1* | 11/2021 | Manolakos | G01S 5/0221 |
| 2022/0006583 A1 | 1/2022 | Manolakos | |
| 2022/0007327 A1* | 1/2022 | Choi | H04W 64/006 |
| 2022/0099786 A1 | 3/2022 | Choi et al. | |
| 2022/0163614 A1* | 5/2022 | Wong | H04W 64/00 |
| 2022/0272592 A1 | 8/2022 | Choi et al. | |

* cited by examiner

SUPPLEMENTAL POSITIONING REFERENCE SIGNAL TRANSMISSION

FIELD OF TECHNOLOGY

The following relates to wireless communications, including supplemental positioning reference signal transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support sidelink communications between UEs. In such systems, it may be appropriate for a UE to be aware of a position or geographic location of another UE. As such, the UE may receive positioning reference signals (PRSs) from the other UE, and the UE may use the PRSs to compute the position of the other UE. Improved techniques for utilizing PRSs for sidelink positioning may be desirable.

SUMMARY

The described techniques relate to improved methods, systems, devices, and apparatuses that support supplemental positioning reference signal (PRS) transmission. A first UE may be configured to transmit PRSs to a second UE in an unshared radio frequency spectrum and transmit supplemental PRSs to the second UE in a shared spectrum. The second UE may then use the supplemental PRSs in the shared spectrum in addition to the PRSs in the unshared spectrum to perform positioning measurements associated with the first UE. In some cases, the first UE may signal a configuration for the supplemental PRSs to the second UE, and, in other cases, a base station may signal the configuration for the supplemental PRSs to the second UE. In any case, because the second UE may use both the PRSs in the unshared spectrum and the supplemental PRSs in the shared spectrum to perform the positioning measurements, the accuracy of the positioning measurements associated with the first UE may be improved.

A method for wireless communication at a first UE is described. The method may include determining to transmit a first set of one or more PRSs in an unshared spectrum and a second, supplementary set of one or more PRSs in a shared spectrum, performing a channel access procedure on the shared spectrum to transmit the second, supplementary set of one or more PRSs based on the determining, and transmitting, to a second UE, the first set of one or more PRSs in the unshared spectrum, the second, supplementary set of one or more PRSs in the shared spectrum, or both based on performing the channel access procedure.

An apparatus for wireless communication at a first UE is described. The apparatus may include a processor, memory coupled with the processor, and instructions stored in the memory. The instructions may be executable by the processor to cause the apparatus to determine to transmit a first set of one or more PRSs in an unshared spectrum and a second, supplementary set of one or more PRSs in a shared spectrum, perform a channel access procedure on the shared spectrum to transmit the second, supplementary set of one or more PRSs based on the determining, and transmit, to a second UE, the first set of one or more PRSs in the unshared spectrum, the second, supplementary set of one or more PRSs in the shared spectrum, or both based on performing the channel access procedure.

Another apparatus for wireless communication at a first UE is described. The apparatus may include means for determining to transmit a first set of one or more PRSs in an unshared spectrum and a second, supplementary set of one or more PRSs in a shared spectrum, means for performing a channel access procedure on the shared spectrum to transmit the second, supplementary set of one or more PRSs based on the determining, and means for transmitting, to a second UE, the first set of one or more PRSs in the unshared spectrum, the second, supplementary set of one or more PRSs in the shared spectrum, or both based on performing the channel access procedure.

A non-transitory computer-readable medium storing code for wireless communication at a first UE is described. The code may include instructions executable by a processor to determine to transmit a first set of one or more PRSs in an unshared spectrum and a second, supplementary set of one or more PRSs in a shared spectrum, perform a channel access procedure on the shared spectrum to transmit the second, supplementary set of one or more PRSs based on the determining, and transmit, to a second UE, the first set of one or more PRSs in the unshared spectrum, the second, supplementary set of one or more PRSs in the shared spectrum, or both based on performing the channel access procedure.

Some examples of the method, apparatuses, and non-transitory computer-readable medium described herein may further include operations, features, means, or instructions for receiving a configuration message enabling the first UE to transmit the second, supplementary set of one or more PRSs to the second UE in the shared spectrum, where the determining may be based on receiving the configuration message.

Some examples of the method, apparatuses, and non-transitory computer-readable medium described herein may further include operations, features, means, or instructions for receiving, in the configuration message, an indication of a frequency location of the second, supplementary set of one or more PRSs, a frequency bandwidth of the second, supplementary set of one or more PRSs, a time window for the second, supplementary set of one or more PRSs, whether phase continuity may be maintained between the first set of one or more PRSs and the second, supplementary set of one or more PRSs, physical parameters related to the second, supplementary set of one or more PRSs, or a combination thereof.

In some examples of the method, apparatuses, and non-transitory computer-readable medium described herein, the configuration message includes a radio resource control (RRC) message or a medium access control (MAC) control element (MAC-CE).

Some examples of the method, apparatuses, and non-transitory computer-readable medium described herein may further include operations, features, means, or instructions for transmitting, to the second UE, a configuration message enabling the second UE to receive the second, supplementary set of one or more PRSs from the first UE in the shared spectrum.

Some examples of the method, apparatuses, and non-transitory computer-readable medium described herein may further include operations, features, means, or instructions for transmitting, in the configuration message, an indication of a frequency location of the second, supplementary set of one or more PRSs, a frequency bandwidth of the second, supplementary set of one or more PRSs, a time window for the second, supplementary set of one or more PRSs, whether phase continuity may be maintained between the first set of one or more PRSs and the second, supplementary set of one or more PRSs, physical parameters related to the second, supplementary set of one or more PRSs, or a combination thereof.

In some examples of the method, apparatuses, and non-transitory computer-readable medium described herein, the configuration message includes a sidelink control information message.

In some examples of the method, apparatuses, and non-transitory computer-readable medium described herein, transmitting the second, supplementary set of one or more PRSs may include operations, features, means, or instructions for identifying resources for transmitting the second, supplementary set of one or more PRSs based on resources reserved for transmitting the first set of one or more PRSs and transmitting the second, supplementary set of one or more PRSs on the identified resources.

In some examples of the method, apparatuses, and non-transitory computer-readable medium described herein, a bandwidth, starting location, or both of the resources for transmitting the second, supplementary set of one or more PRSs may be based on the resources reserved for transmitting the first set of one or more PRSs.

In some examples of the method, apparatuses, and non-transitory computer-readable medium described herein, a time window for transmitting the second, supplementary set of one or more PRSs may be determined at the first UE.

In some examples of the method, apparatuses, and non-transitory computer-readable medium described herein, the time window includes one or more transmission occasions for transmitting the second, supplementary set of one or more PRSs.

Some examples of the method, apparatuses, and non-transitory computer-readable medium described herein may further include operations, features, means, or instructions for transmitting, to the second UE after one or more transmission occasions for transmitting the second, supplementary set of one or more PRSs, a configuration message indicating whether the first UE transmitted the second, supplementary set of one or more PRSs in the shared spectrum.

In some examples of the method, apparatuses, and non-transitory computer-readable medium described herein, determining to transmit the second, supplementary set of one or more PRSs may include operations, features, means, or instructions for determining to transmit the second, supplementary set of one or more PRSs based on a quality of service requirement for positioning, a load or congestion level of PRSs, or both.

In some examples of the method, apparatuses, and non-transitory computer-readable medium described herein, transmitting the first set of one or more reference signals, the second, supplementary set of one or more PRSs or both may include operations, features, means, or instructions for transmitting the first set of one or more reference signals and the second, supplementary set of one or more reference signals separately in the unshared spectrum and the shared spectrum respectively.

In some examples of the method, apparatuses, and non-transitory computer-readable medium described herein, transmitting the first set of one or more reference signals, the second, supplementary set of one or more PRSs or both may include operations, features, means, or instructions for transmitting the first set of one or more reference signals and the second, supplementary set of one or more reference signals in a single transmission across a bandwidth spanning the unshared spectrum and the shared spectrum.

In some examples of the method, apparatuses, and non-transitory computer-readable medium described herein, the channel access procedure includes a category one listen-before-talk procedure, a category two listen-before-talk procedure, or a category four listen-before-talk procedure.

A method for wireless communication at a first UE is described. The method may include receiving a configuration message enabling the first UE to receive a first set of one or more PRSs from a second UE in an unshared spectrum and a second, supplementary set of one or more PRSs from the second UE in a shared spectrum, receiving, from the second UE, the first set of one or more PRSs in the unshared spectrum and the second, supplementary set of one or more PRSs in the shared spectrum, and computing a position of the second UE based on the first set of one or more PRSs and the second set of one or more PRSs.

An apparatus for wireless communication at a first UE is described. The apparatus may include a processor, memory coupled with the processor, and instructions stored in the memory. The instructions may be executable by the processor to cause the apparatus to receive a configuration message enabling the first UE to receive a first set of one or more PRSs from a second UE in an unshared spectrum and a second, supplementary set of one or more PRSs from the second UE in a shared spectrum, receive, from the second UE, the first set of one or more PRSs in the unshared spectrum and the second, supplementary set of one or more PRSs in the shared spectrum, and compute a position of the second UE based on the first set of one or more PRSs and the second set of one or more PRSs.

Another apparatus for wireless communication at a first UE is described. The apparatus may include means for receiving a configuration message enabling the first UE to receive a first set of one or more PRSs from a second UE in an unshared spectrum and a second, supplementary set of one or more PRSs from the second UE in a shared spectrum, means for receiving, from the second UE, the first set of one or more PRSs in the unshared spectrum and the second, supplementary set of one or more PRSs in the shared spectrum, and means for computing a position of the second UE based on the first set of one or more PRSs and the second set of one or more PRSs.

A non-transitory computer-readable medium storing code for wireless communication at a first UE is described. The code may include instructions executable by a processor to receive a configuration message enabling the first UE to receive a first set of one or more PRSs from a second UE in an unshared spectrum and a second, supplementary set of one or more PRSs from the second UE in a shared spectrum, receive, from the second UE, the first set of one or more PRSs in the unshared spectrum and the second, supplementary set of one or more PRSs in the shared spectrum, and compute a position of the second UE based on the first set of one or more PRSs and the second set of one or more PRSs.

Some examples of the method, apparatuses, and non-transitory computer-readable medium described herein may further include operations, features, means, or instructions for receiving, in the configuration message, an indication of a frequency location of the second, supplementary set of one or more PRSs, a frequency bandwidth of the second, supplementary set of one or more PRSs, a time window for the second, supplementary set of one or more PRSs, whether phase continuity may be maintained between the first set of one or more PRSs and the second, supplementary set of one or more PRSs, physical parameters related to the second, supplementary set of one or more PRSs, or a combination thereof.

In some examples of the method, apparatuses, and non-transitory computer-readable medium described herein, the configuration message includes a RRC message, a MAC-CE, or a sidelink control information message.

In some examples of the method, apparatuses, and non-transitory computer-readable medium described herein, receiving the second, supplementary set of one or more PRSs may include operations, features, means, or instructions for identifying resources to monitor for the second, supplementary set of one or more PRSs based on resources reserved for the first set of one or more PRSs and receiving the second, supplementary set of one or more PRSs on the identified resources.

In some examples of the method, apparatuses, and non-transitory computer-readable medium described herein, a bandwidth, starting location, or both of the resources to monitor for the second, supplementary set of one or more PRSs may be based on the resources reserved for the first set of one or more PRSs.

In some examples of the method, apparatuses, and non-transitory computer-readable medium described herein, a time window to monitor for the second, supplementary set of one or more PRSs may be determined at the first UE.

In some examples of the method, apparatuses, and non-transitory computer-readable medium described herein, the configuration message enabling the first UE to receive the first set of one or more PRSs and the second and the method, apparatuses, and non-transitory computer-readable medium may include further operations, features, means, or instructions for receiving, from the second UE after monitoring for the second, supplementary set of one or more PRSs, a second configuration message indicating whether the second UE transmitted the second, supplementary set of one or more PRSs in the shared spectrum.

In some examples of the method, apparatuses, and non-transitory computer-readable medium described herein, buffering signals received on resources in the shared spectrum potentially including the second, supplementary set of one or more PRSs and decoding the buffered signals to identify the second, supplementary set of one or more PRSs based on the second configuration message indicating that the second UE transmitted the second, supplementary set of one or more PRSs in the shared spectrum.

In some examples of the method, apparatuses, and non-transitory computer-readable medium described herein, receiving the first set of one or more reference signals, the second, supplementary set of one or more PRSs, or both may include operations, features, means, or instructions for receiving the first set of one or more reference signals and the second, supplementary set of one or more reference signals separately in the unshared spectrum and the shared spectrum respectively.

In some examples of the method, apparatuses, and non-transitory computer-readable medium described herein, receiving the first set of one or more reference signals, the second, supplementary set of one or more PRSs or both may include operations, features, means, or instructions for receiving the first set of one or more reference signals and the second, supplementary set of one or more reference signals in a single transmission across a bandwidth spanning the unshared spectrum and the shared spectrum.

DETAILED DESCRIPTION

Some wireless communications systems may support sidelink communications between user equipments (UEs). In such systems, it may be appropriate for a UE to be aware of a position or geographic location of another UE. For example, for vehicle maneuver coordination, it may be appropriate for a vehicle to be aware of the position of another vehicle when driving. Thus, UEs supporting sidelink communications may also support techniques for sidelink positioning (e.g., computing a position of another UE). A UE may perform sidelink positioning based on a measurement of positioning reference signals (PRSs) transmitted over a sidelink. For instance, a first UE may receive PRSs from a second UE, and the first UE may use the PRSs to perform positioning measurements associated with the second UE. In some cases, however, a bandwidth used for transmitting PRSs or a quantity of PRSs transmitted may be limited, and the positioning measurements (e.g., timing related measurements between the first UE and the second UE, like time of arrival (ToA), round trip time (RTT), reference signal time difference (RSTD), time difference of arrival (TDoA), etc., and/or angle related measurements between the first UE and the second UE, like angle of arrival (AoA), angle of departure (AoD), etc.) performed based on the PRS transmission at the first UE may not be able to provide sufficient resolution for positioning operations. For example, a range between the first UE and the second UE computed from the measurements or a geographical location of the first UE or the second UE computed based on the measurements may not be able to meet sidelink positioning accuracy requirements.

As described herein, a wireless communications system may support efficient techniques for utilizing PRSs for sidelink positioning. A first UE may be configured to transmit PRSs to a second UE in an unshared radio frequency spectrum and transmit supplemental PRSs to the second UE in a shared spectrum. The second UE may then use the supplemental PRSs in the shared spectrum in addition to the PRSs in the unshared spectrum to compute a position of the first UE. In some cases, the first UE may signal a configuration for the supplemental PRSs to the second UE, and, in other cases, a base station may signal the configuration for the supplemental PRSs to the second UE. In any case, because the second UE may use both the PRSs in the unshared spectrum and the supplemental PRSs in the shared spectrum to compute the position of the first UE, the accuracy of the computed position of the first UE may be improved.

Aspects of the disclosure are initially described in the context of wireless communications systems. Examples of processes and signaling exchanges that support supplemental PRS transmission are then described. Aspects of the disclosure are further illustrated by and described with reference to apparatus diagrams, system diagrams, and flowcharts that relate to supplemental PRS transmission.

Figure 1:
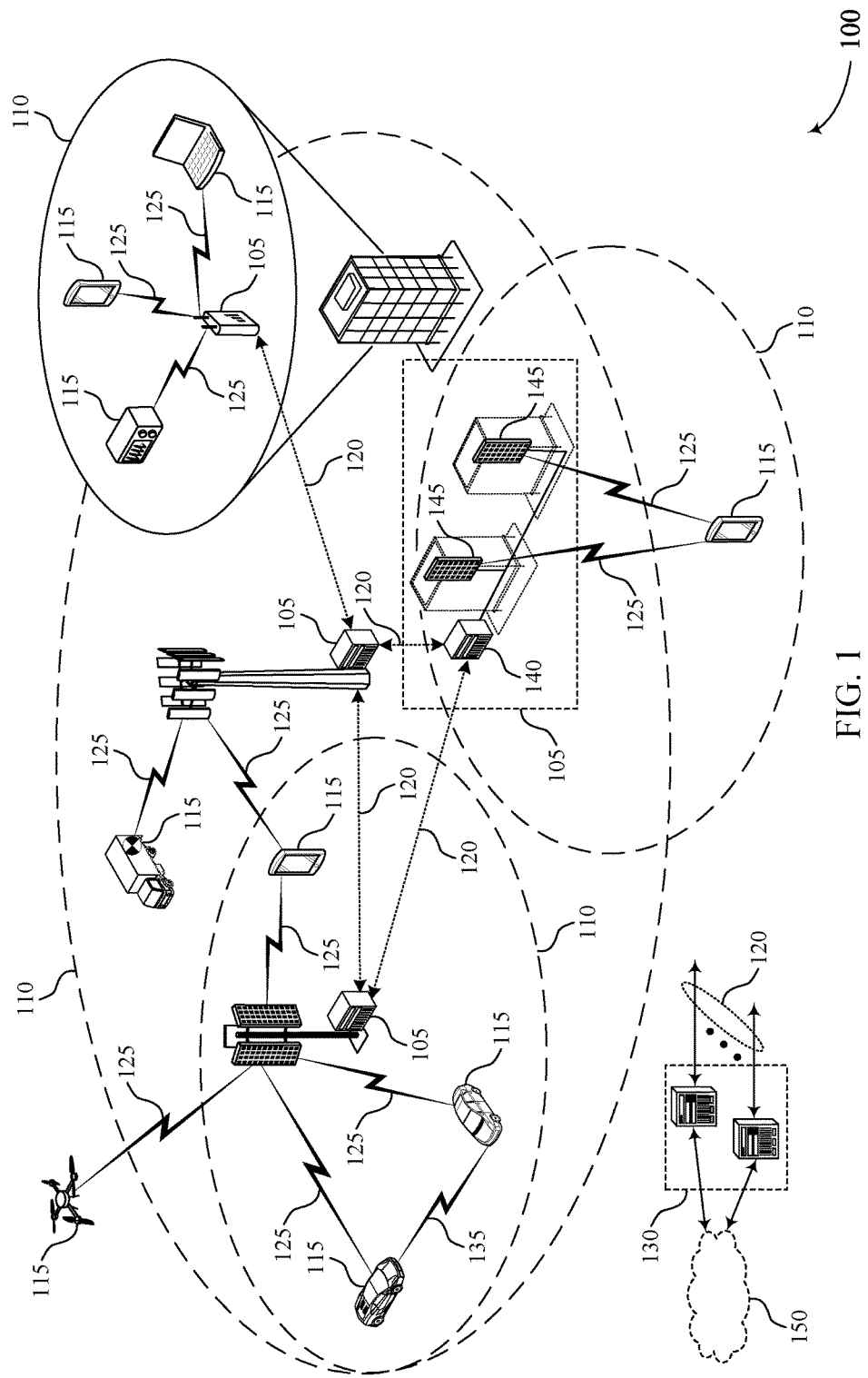
FIG. 1 illustrates an example of a wireless communications system that supports supplemental PRS transmission in accordance with aspects of the present disclosure.

FIG. 1 illustrates an example of a wireless communications system 100 that supports supplemental PRS transmission in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may utilize both unshared (e.g., licensed) and shared (e.g., unlicensed) radio frequency spectrum bands. For example, the wireless communications system 100 may employ License Assisted Access (LAA), LTE-Unlicensed (LTE-U) radio access technology, or NR technology in an unlicensed band (NR-U) such as the 5 GHz industrial, scientific, and medical (ISM) band. When operating in unlicensed radio frequency spectrum bands, devices such as the base stations 105 and the UEs 115 may employ carrier sensing for collision detection and avoidance. For example, the base stations 105 and the UEs 115 may employ LBT procedures to ensure a frequency channel (e.g., an LBT subchannel or a frequency band that is accessible via an LBT procedure) is clear before transmitting data. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

In some implementations, there may be different categories of LBT procedures, including category 1 LBT, category 2 LBT, category 3 LBT, and category 4 LBT. A category 1 LBT may refer to an LBT without energy sensing (e.g., transmitting immediately, similar to type 2c channel access in NR-U). A category 2 LBT may refer to an LBT with a random back-off (e.g., transmitting if sensed energy in a certain period is below a threshold, similar to type 2a or 2b channel access in NR-U). In some cases, a category 2 LBT procedure may be referred to as a one-time LBT procedure where a UE 115 may perform channel sensing for a defined duration (e.g., 25 µs). A category 3 LBT may refer to LBT with a random (or other) back-off and a fixed sized contention window. A category 4 LBT may refer to LBT with a random back-off with a contention window of variable size (e.g., transmitting if sensed energy in a contention window is below a threshold, similar to type 1 channel access in NR-U). In some cases, a category 4 LBT procedure may be referred to as a fairness-based LBT procedure for performing channel sensing with a backoff, where the backoff may be used to prevent a UE 115 from accessing a channel immediately after detecting that the channel is clear. In some aspects, category 1 and category 2 LBT may be allowed.

In some examples, a UE 115 may also be able to communicate directly with other UEs 115 over a device-to-device (D2D) communication link 135 (e.g., using a peer-to-peer (P2P) or D2D protocol). The D2D communication link 135 may be referred to as a sidelink. One or more UEs 115 utilizing sidelink communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for sidelink communications (e.g., in a resource allocation mode 1). In other cases, D2D communications are carried out between the UEs 115 without the involvement of a base station 105 (e.g., in a resource allocation mode 2).

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

In some cases, sidelink communications may include communications over one or more sidelink channels. That is, a number of sidelink signals or physical channels may be specified for transmissions either in a cellular spectrum (e.g., sidelink shared spectrum in licensed cellular band) or in dedicated intelligent transportation system (ITS) spectrum. Sidelink data transmissions may be over a physical sidelink shared channel (PSSCH), discovery expression transmissions may be over a physical sidelink discovery channel (PSDCH) (e.g., to allow proximal devices to discover each other's presence), control information transmissions may be over a physical sidelink control channel (PSCCH), and feedback transmissions may be over a physical sidelink feedback channel (PSFCH).

In wireless communications system 100, it may be appropriate for UEs 115 supporting sidelink communications to be aware of positions or geographic locations of other UEs 115 in wireless communications system. Thus, UEs 115 may support techniques for sidelink positioning (e.g., computing a position of another UE). Sidelink positioning may include both relative and absolute positioning, where determining relative positioning corresponds to determining a distance between two UEs 115 (e.g., based on signals exchanged between the UEs 115), and determining absolute positioning corresponds to determining geographic coordinates of a UE 115 (e.g., relative to a fixed entity, such as a roadside unit). In some examples, sidelink positioning may refer to high accuracy positioning for vehicle-to-everything (V2X), public safety, or commercial use cases.

Sidelink positioning may be performed based on a measurement of PRSs transmitted over a sidelink. For instance, sidelink positioning may be based on measurements of a time of arrival (ToA), time difference of arrival (TDoA), angle of arrival (AoA), round-trip time (RTT), etc. of a sidelink PRS. Further, a positioning accuracy may be largely determined by a sidelink PRS bandwidth. The sidelink PRS bandwidth may refer to a bandwidth used to transmit one or more sidelink PRSs. In some cases, positioning accuracy requirements may depend on a sidelink or V2X application. For instance, sub-meter level accuracy may be appropriate for some applications (e.g., vehicle maneuver coordination), while requirements for some applications may be relaxed (e.g., non-safety related applications).

As mentioned above, a positioning accuracy that can be achieved may depend on a PRS bandwidth (e.g., a bandwidth used to transmit one or more PRSs). The larger the PRS bandwidth, the higher the positioning accuracy. In some examples, a very large bandwidth (e.g., 80 MHz or higher) may be appropriate for some positioning applications. However, a licensed or ITS spectrum may have limited bandwidth. For example, depending on regions, there may be 10 to 40 MHz ITS bandwidth available for NR V2X, and an accuracy provided by 10 to 40 MHz may be suitable for some applications, but may not be sufficient for other applications. To improve positioning accuracy, wireless communications system 100 may support techniques for using supplemental PRSs to improve positioning accuracy (e.g., in an adjacent unlicensed spectrum). For instance, V2X may be deployed at an ITS spectrum (e.g., from 5.895 to 5.925 GHz), and the adjacent unlicensed band (e.g., UN-II 3/4 from 5.725 to 5.895, or UN-II from 5.925) may be used to transmit the supplemental PRSs.

Although the use of the unlicensed spectrum may facilitate transmission of supplemental PRSs, the unlicensed spectrum may be shared by other technologies (e.g., Wireless Fidelity (Wi-Fi)). As such, access to the unlicensed spectrum may be subject to regulatory requirements. For instance, one of the regulatory requirements is LBT, where a device may perform channel sensing (e.g., listening) before the device may transmit (e.g., talk). LBT may be referred to as a channel access procedure. As part of LBT, the device may sense energy and may transmit if the energy is below a threshold. Thus, when a sidelink supplemental PRS is transmitted in an unlicensed spectrum, a transmission location (e.g., time or frequency location) may be uncertain (e.g., due to the uncertainty from LBT, since a transmitter may transmit when it passes LBT).

Wireless communications system 100 may support efficient techniques for facilitating transmission and reception of one or more supplemental PRSs in an unlicensed or shared spectrum. In particular, if a sidelink positioning quality of service (QoS) may not be met based on regular PRS transmission (e.g., PRS transmission in an unshared spectrum), transmission of supplemental PRS in an adjacent unlicensed band may be enabled. In some cases, a UE 115 may transmit a supplemental PRS in an unlicensed band based on regulatory requirements for accessing the unlicensed band (e.g., LBT), an uncertainty of PRS transmission due to LBT, and a receive UE processing of the supplemental PRS and a regular PRS (e.g., PRS in an unshared spectrum). Thus, the techniques described herein (e.g., procedures and signals) may be used to enable supplemental PRS transmission considering LBT operation and receive UE PRS processing.

Figure 2:
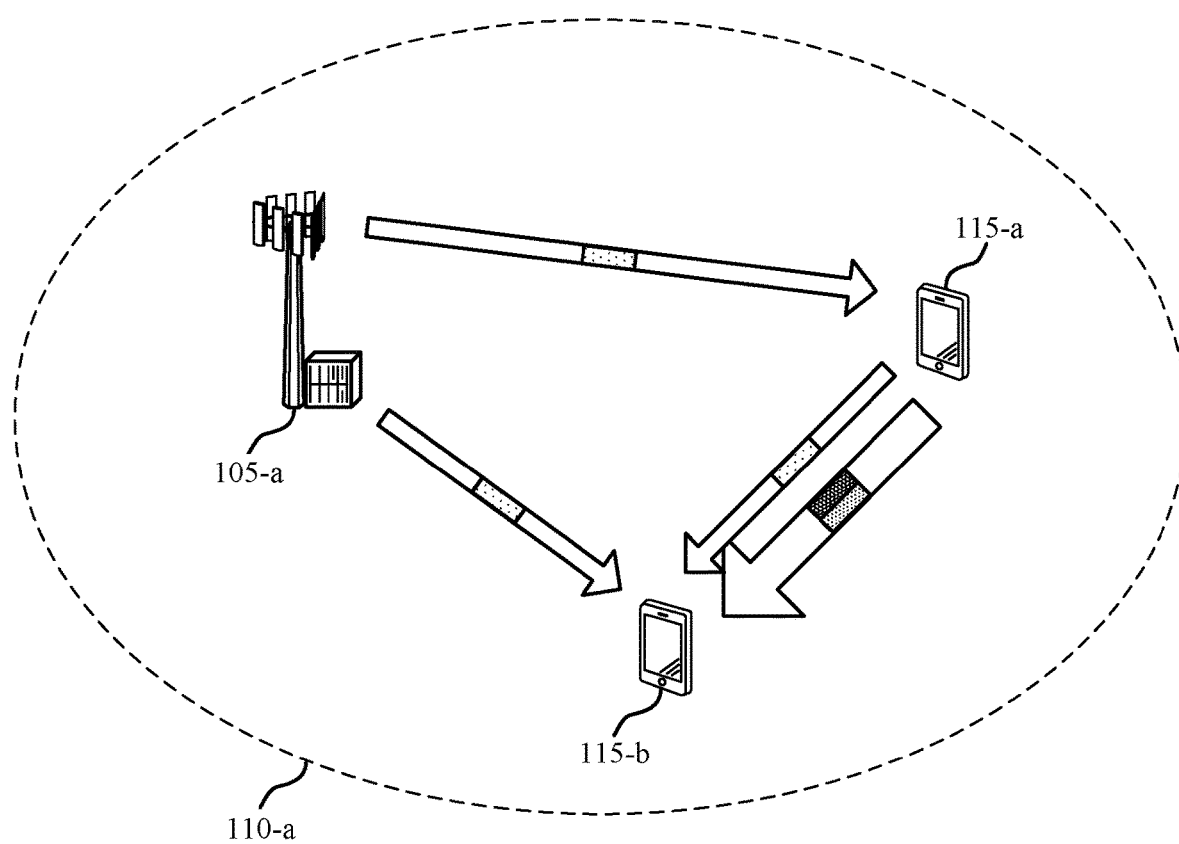
FIG. 2 illustrates an example of a wireless communications system that supports supplemental PRS transmission in accordance with aspects of the present disclosure.

FIG. 2 illustrates an example of a wireless communications system 200 that supports supplemental PRS transmission in accordance with aspects of the present disclosure. The wireless communications system 200 includes a UE 115-*a* and a UE 115-*b*, which may be examples of UEs 115 described with reference to FIG. 1. The wireless communications system 200 also includes a base station 105-*a*, which may be an example of a base station 105 described with reference to FIG. 1. The base station 105-*a* may provide communication coverage for UEs 115 in a geographic coverage area 110-*a*, which may be an example of a geographic coverage area 110 described with reference to FIG. 1. The wireless communications system 200 may implement aspects of the wireless communications system 100. For example, the wireless communications system 200 may support efficient techniques for using supplemental PRSs to improve positioning accuracy.

In FIG. 2, the UE 115-*a* may be enabled to transmit sidelink PRSs 210 in an unshared spectrum (e.g., regular sidelink PRS transmission). Accordingly, in one example, the UE 115-*a* may transmit the sidelink PRSs 210 in an ITS or licensed V2X band. Further, the UE 115-*a* may transmit the sidelink PRSs 210 in a dedicated resource pool (e.g., configured for sidelink PRS transmission), or the UE 115-*a* may transmit the sidelink PRSs 210 in a same resource pool that is configured for PSSCH transmission. In some cases, the UE 115-*a* (e.g., transmitting UE) may indicate or reserve a resource on which to transmit the sidelink PRSs 210 (e.g., a resource on which the regular sidelink PRS transmission may take place).

In addition, the UE 115-*a* may also indicate a supplemental PRS configuration 205 for transmitting the supplemental PRSs 215 (e.g., if the UE 115-*a* determines to transmit supplemental sidelink PRSs). For instance, the supplemental PRS configuration 205 may enable the UE 115-*a* to transmit the supplemental PRSs 215 and enable the UE 115-*b* to receive the supplemental PRSs 215. In some cases, the supplemental PRS configuration 205 may be included in a same container as a PRS configuration for the sidelink PRSs 210. In other cases, the supplemental PRS configuration 205 may be separate from the PRS configuration for the sidelink PRSs 210.

The supplemental PRS configuration 205 may include one or more of a frequency location of the supplemental PRSs 215, a frequency bandwidth (or range of the frequency bandwidth) of the supplemental PRSs 215, a time resource location or time window for transmitting the supplemental PRSs 215, whether phase continuity between the sidelink PRSs 210 and the sidelink, supplemental PRSs 215 is maintained, and physical parameters related to the supplemental PRSs 215. The physical parameters related to the supplemental PRSs 215 may include a sequence seed, a frequency resource pattern (e.g., comb level, such as comb-2), or a number of OFDM symbols.

In one aspect, the base station 105-*a* may transmit the supplemental PRS configuration 205 to the UE 115-*a* (e.g., in an RRC message or MAC control element (MAC-CE)), and the UE 115-*a* may receive the supplemental PRS configuration 205 from the base station 105-*a*. In some cases, the UE 115-*a* may then transmit the supplemental PRS configuration 205 to the UE 115-*b* (e.g., in a sidelink control information (SCI) message). Additionally, or alternatively, the base station 105-*a* may transmit the supplemental PRS configuration to the UE 115-*b* (e.g., in an RRC message or MAC-CE). The transmission of the supplemental PRS configuration to the UE 115-*a* and the UE 115-*b* may be the same or different.

In another aspect, the UE 115-*a* may receive the supplemental PRS configuration 205 at a lower layer at the UE 115-*a* (e.g., MAC or PHY layer) from an upper layer at the UE 115-*a* (e.g., RRC, RLC, or PDCP layer), and the UE 115-*a* may transmit the supplemental configuration 205 to the UE 115-*b*. In this aspect, the UE 115-*a* may determine to transmit the supplemental PRSs 215 and may generate the supplemental PRS configuration 205 autonomously (e.g., without receiving a supplemental PRS configuration 205 from the base station 105-*a*). In yet another aspect, the supplemental PRS configuration 205 may be implied or implicit based on a PRS configuration for the PRSs 210. In this aspect, the UE 115-*a* may identify resources on which to transmit the supplemental PRSs 215, and the UE 115-*b* may identify resources on which to receive the supplemental PRSs 215, based on the PRS configuration for the PRSs 210.

After receiving the supplemental PRS configuration 205 from the base station 105-*a*, the UE 115-*a* may determine to transmit the supplemental PRSs 215 to the UE 115-*b*. Thus, the base station 105-*a* may determine to enable the UE 115-*a* to transmit the supplemental PRSs 215. Alternatively, the UE 115-*a* may determine to transmit the supplemental PRSs 215 autonomously (e.g., without receiving the supplemental PRS configuration 205 from the base station 105-*a*). The base station 105-*a* or the UE 115-*a* may determine whether to enable the use of supplemental PRSs based on a required positioning accuracy (e.g., a quality of service (QoS) of sidelink positioning) or based on a load or congestion level of PRSs (e.g., regular and supplemental PRS transmissions). The load or congestion level of PRSs may refer to a quantity of PRSs being transmitted or expected to be transmitted (e.g., whether there are many other UEs 115 transmitting regular or supplemental PRSs).

Once the UE 115-*a* determines to transmit the supplemental PRSs 215 (e.g., autonomously or based on receiving a supplemental PRS configuration 205 from the base station 105-*a*), the UE 115-*a* may perform a channel access procedure to gain access to a shared spectrum to transmit the supplemental PRSs 215. The channel access procedure may be a type 1, type 2a, type 2b, or type 2c channel access procedure. In some examples, the channel access procedure performed by the UE 115-a may be an LBT, and the LBT performed by the UE 115-a may be a category 2 or category 4 LBT. The channel access procedure to be performed by the UE 115-a may be defined (e.g., preconfigured) at the UE 115-a. In some cases, the UE 115-a may also identify one or more transmission occasions in a shared spectrum in which the UE 115-a may transmit the supplemental PRSs 215. The greater the quantity of transmission occasions, the greater the chance the UE 115-a may have to gain access to the shared spectrum to transmit the supplemental PRSs 215.

The UE 115-a may then transmit the supplemental PRSs 215 in the shared spectrum (e.g., unlicensed band) if the UE 115-a passes LBT for the supplemental PRS transmission. In addition, the UE 115-a may transmit the sidelink PRSs 210 (e.g., regular sidelink PRS) on an indicated or reserved PRS resource. In some cases, the UE 115-a may transmit the supplemental PRSs 215 as a different component carrier (or channel). For instance, the physical layer processing of the PRSs 210 and the supplemental PRSs 215 may be separate (e.g., separate operations for OFDM signal generation). Alternatively, the UE 115-a may transmit the supplemental PRSs 215 and the PRSs 210 in a larger bandwidth (e.g., if the supplemental PRSs 215 and the PRSs 210 are to be transmitted in a same time instance in contiguous frequency resources). The larger bandwidth may include a bandwidth allocated for the PRSs 210 plus a bandwidth allocated for the supplemental PRSs 215 with or without a gap between the bandwidth for the PRSs 210 and the bandwidth for the supplemental PRSs 215 (e.g., the UE 115-a may perform a single OFDM signal generation which includes both a regular PRS and a supplemental PRS transmission).

In some cases, the bandwidth for the supplemental PRSs 215 (e.g., supplemental PRS bandwidth) may be the same as a bandwidth indicated in the supplemental PRS configuration 205. If the UE 115-a is unable to pass LBT for the indicated bandwidth, the UE 115-a may give up and refrain from transmitting the supplemental PRSs 215. Alternatively, depending on LBT outcome, the UE 115-a may transmit the supplemental PRSs 215 in a bandwidth in which the UE 115-a passes LBT. Thus, the UE 115-a may receive an indication of a first bandwidth in which to transmit the supplemental PRSs 215, and the UE 115-a may perform a channel access procedure to gain access to a second bandwidth to transmit the supplemental PRSs 215 (e.g., if a channel access procedure failed for the first bandwidth). In some examples, the first bandwidth may be larger than the second bandwidth and the first bandwidth may include the second bandwidth (e.g., the first bandwidth may be 80 MHz and the second bandwidth is 40 MHz of the 80 MHz).

The UE 115-b may receive the PRSs 210 and the supplemental PRSs 215 from the UE 115-a and may perform positioning measurements associated with the UE 115-a using the PRSs 210 and the supplemental PRSs 215. The UE 115-b (e.g., receiving UE) may receive the PRSs 210 on the indicated or reserved PRS resource, and the UE 115-b may also detect the supplemental PRSs 215 based on the indicated or implied supplemental PRS configuration 205. If the UE 115-b is able to detect the supplemental PRSs 215, the UE 115-b may perform measurement for positioning based on both the PRSs 210 and the supplemental PRSs 215. For example, the UE 115-a may stitch the two PRSs (e.g., PRSs 210 and supplemental PRSs 215) and may achieve a more accurate timing measurement (e.g., because the PRSs 210 and the supplemental PRSs 215 are transmitted on a larger PRS bandwidth).

Additionally, or alternatively, the UE 115-b may buffer signals received in a supplemental PRS resource or time window. The UE 115-a may transmit an indication (e.g., in a sidelink positioning assistance message following the PRS transmission occasion) indicating whether the UE 115-a transmitted supplemental PRSs 215 to the UE 115-b. The UE 115-b may then process the supplemental PRSs 215 from the buffered signals if the UE 115-a indicates that the supplemental PRSs 215 have been sent. In some cases, if phase continuity has not been maintained between the two PRSs (e.g., the PRSs 210 and the supplemental PRSs 215), the UE 115-b may estimate a phase offset and then perform joint PRS processing (e.g., using the estimated phase offset). Alternatively, the UE 115-b may identify a phase offset from a supplemental PRS configuration 205, and the UE 115-b may perform joint PRS processing (e.g., using the identified phase offset).

Figure 3:
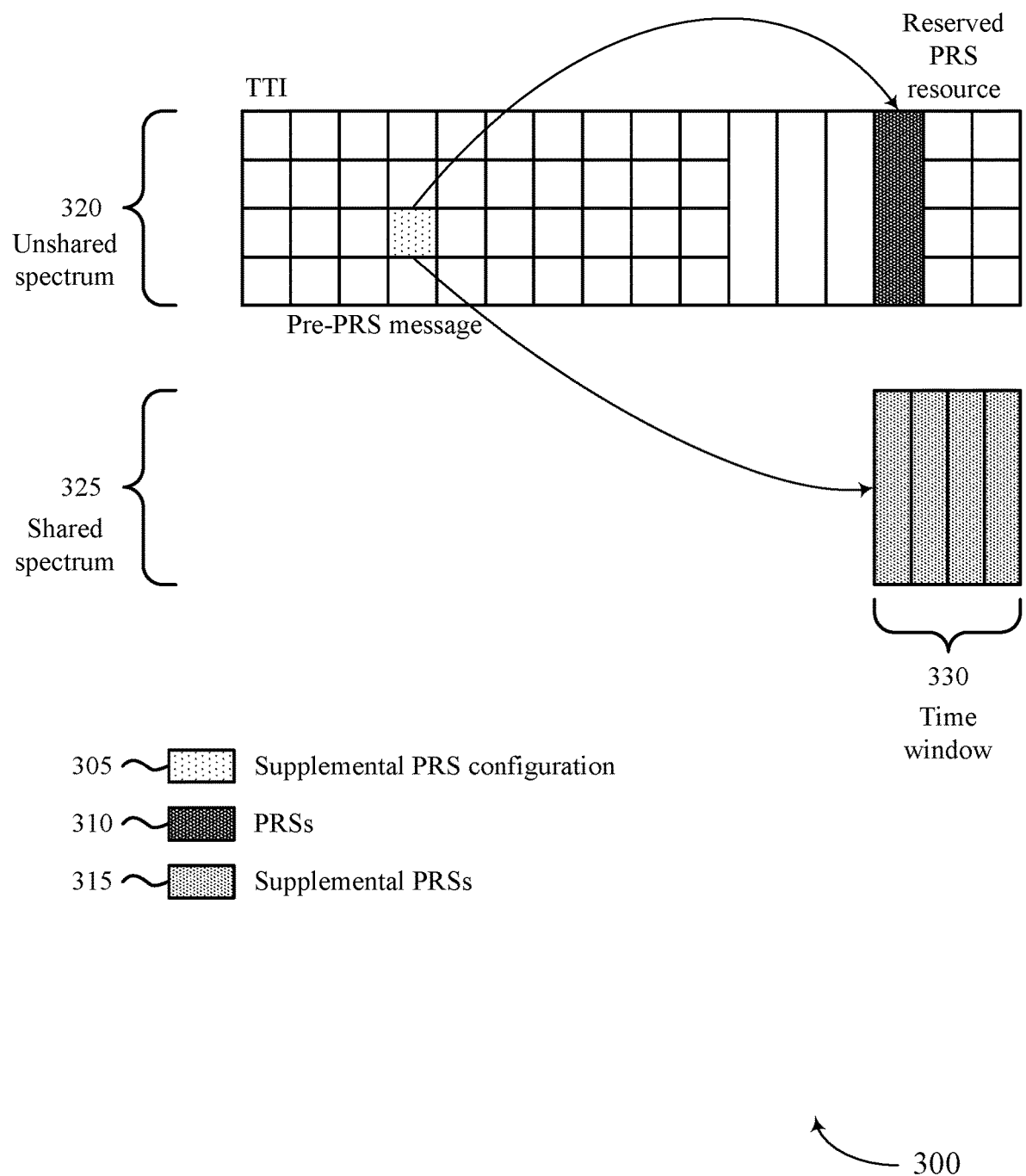
FIG. 3 illustrates an example of a configuration for supplemental PRS transmission in accordance with aspects of the present disclosure.

FIG. 3 illustrates an example of a configuration 300 for supplemental PRS transmission in accordance with aspects of the present disclosure. In FIG. 3, a transmitting UE 115 or a base station 105 may transmit a supplemental PRS configuration 305 in a sidelink positioning assistance message prior to the PRS transmission to a receiving UE 115 enabling the receiving UE 115 to receive supplemental PRSs 315 from the transmitting UE 115. The transmitting UE 115 may also reserve resources for transmitting PRSs 310 (e.g., regular PRSs) to the receiving UE 115. The transmitting UE 115 may then transmit the PRSs 310 to the receiving UE 115 in an unshared spectrum 320, and the transmitting UE 115 may transmit the supplemental PRSs 315 to the receiving UE 115 in a time window 330 in the shared spectrum 325. The receiving UE 115 may receive the PRSs 310 and the supplemental PRSs 315 in the unshared spectrum 320 and the shared spectrum 325 respectively, and the receiving UE 115 may use the PRSs 310 and the supplemental PRSs 315 to perform positioning measurements associated with the transmitting UE 115.

The transmitting UE 115 may indicate (or reserve) one or more multiple resources in which to transmit PRSs 310 to a receiving UE 115 (e.g., resources in which a regular sidelink PRS transmission may take place). In some cases, the reservation may be based on a resource reservation mechanism where the transmitting UE 115 reserves a future resource for a future transmission, and the reservation may be for transmitting the sidelink PRSs 310. Additionally, or alternatively, the transmitting UE 115 may indicate a time resource in which to transmit the PRSs 310 (e.g., time resource in which a sidelink PRS transmission may take place) via a sidelink positioning assistance message prior to the PRS transmission (e.g., a pre-PRS message) transmitted by the transmitting UE 115 (e.g., a resource pool consisting of dedicated resources for sidelink PRS may be configured, and the sidelink positioning assistance message prior to the PRS transmission indicates a resource in the pool for regular PRS transmission).

In addition to transmitting a configuration for the PRSs 310, the transmitting UE 115 may also indicate a supplemental PRS configuration 305 (e.g., supplemental sidelink PRS configuration) to the receiving UE 115. The supplemental PRS configuration 305 may indicate a frequency bandwidth (e.g., 40 MHz adjacent to a regular sidelink PRS at lower frequency), or range of the frequency bandwidth (e.g., from 40 MHz to 80 MHz adjacent to the regular sidelink PRS), or minimum bandwidth for the frequency bandwidth (e.g., 20 MHz adjacent to regular sidelink PRS, but the transmitting UE 115 can transmit on a larger bandwidth if LBT indicates that the larger bandwidth is idle) of the supplemental PRSs 315 (e.g., supplemental sidelink PRS).

The supplemental PRS configuration 305 may also indicate a time location of the supplemental PRSs 315. The time location of the supplemental PRSs 315 may be the same as a time occasion for the PRSs 310 or may be a time window located around an indicated or reserved occasion for the PRSS 310. The time window for transmitting the supplemental PRSs 315 may include more than one supplemental PRS transmission occasion, which may reduce uncertainty due to LBT. The supplemental PRS configuration 305 may also indicate whether phase continuity between the PRSs 310 and the supplemental PRSs 315 is maintained such that the receiving UE 115 may determine whether or how to aggregate the PRSs 310 and the supplemental PRSs 315 for PRS measurement.

In some cases, the transmitting UE 115 may reserve a regular sidelink PRS resource in a regular sidelink PRS resource pool. For instance, the transmitting UE 115 may transmit a sidelink positioning assistance message prior to the PRS transmission reserving the regular sidelink PRS resource. The sidelink positioning assistance message prior to the PRS transmission may also include the supplemental PRS configuration 305. The supplemental PRS configuration 305 may indicate a time window 330, with multiple supplemental PRS occasions (e.g., discrete time intervals) for transmitting the supplemental PRSs 315 (i.e., the time window 330 is configured by the transmitting UE 115 via the sidelink positioning assistance message prior to the PRS transmission). Alternatively, the time window 330 for transmitting the supplemental PRSs 315 may be implied or implicit. As such, when supplemental PRS is enabled, the time window 330 may be based on (e.g., implied by) a location of the reserved PRS resource for the PRSs 310. As an example, some parameters related to the time window 330 may be defined at the transmitting UE 115 and the receiving UE 115 (e.g., preconfigured), such as a starting location of the time window 330 relative to a reserved resource for the PRSs 310, a duration of the time window 330, or a bandwidth for transmitting the supplemental PRSs 315.

After identifying the time window 330, the transmitting UE 115 may perform LBT to transmit the supplemental PRSs 315 in the time window 330. In some cases, the time window 330 for the supplemental PRSs 315 may be a same duration as a reserved regular PRS resource. Further, the transmitting UE 115 may give up transmitting the supplemental PRSs 315 if the transmitting UE 115 fails LBT for transmitting in the time window 330. In some cases, after transmitting the supplemental PRSs 315 or after the time window 330 for transmitting the supplemental PRSs 315, the transmitting UE 115 may indicate to the receiving UE 115 whether or when the supplemental PRSs 315 have been transmitted. In such cases, the receiving UE 115 may buffer signals received in the time window 330, and the receiving UE 115 may process the buffered signals if the transmitting UE 115 indicates that the supplemental PRSs 315 have been transmitted. As such, the receiving UE 115 may save power since the receiving UE 115 may avoid trying to detect the supplemental PRSs 315 in the time window 330 even if the supplemental PRSs 315 have not been transmitted.

Figure 4:
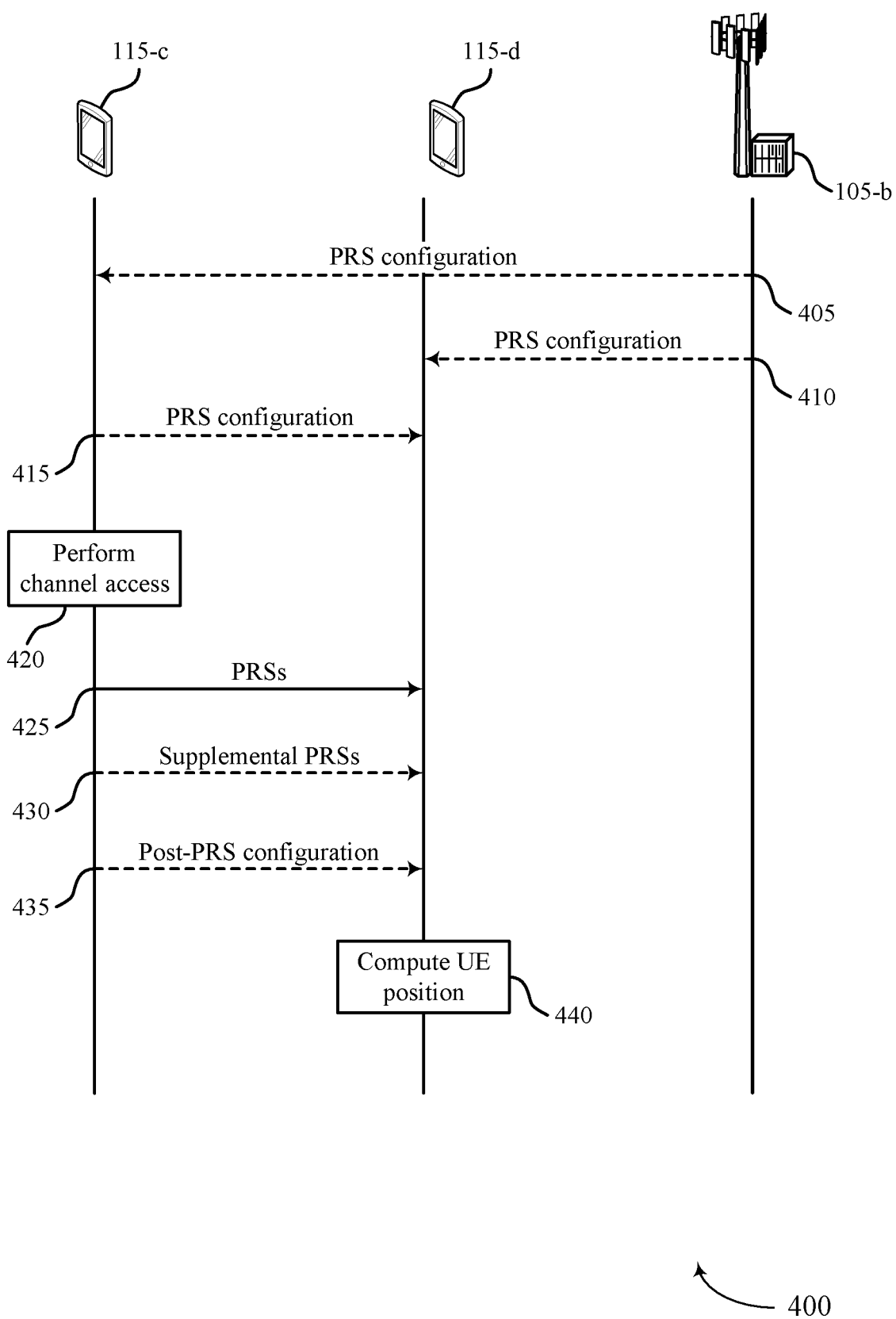
FIG. 4 illustrates an example of a process flow that supports supplemental PRS transmission in accordance with aspects of the present disclosure.

FIG. 4 illustrates an example of a process flow 400 that supports supplemental PRS transmission in accordance with aspects of the present disclosure. Process flow 400 includes a UE 115-*c* and a UE 115-*d*, which may be examples of UEs 115 described with reference to FIGS. 1-3. Process flow 400 also includes a base station 105-*b*, which may be an example of a base station 105 described with reference to FIGS. 1-3. The process flow 400 may implement aspects of wireless communications system 200. For example, the process flow 400 may support efficient techniques for using supplemental PRSs to improve positioning accuracy.

In the following description of the process flow 400, the signaling exchanged between the UE 115-*c*, the UE 115-*d*, and the base station 105-*b* may be exchanged in a different order than the example order shown, or the operations performed by the UE 115-*c*, the UE 115-*d*, and the base station 105-*b* may be performed in different orders or at different times. Some operations may also be omitted from the process flow 400, and other operations may be added to the process flow 400.

At 405, the base station 105-*b* may transmit, and the UE 115-*c* may receive, a configuration message (e.g., an RRC message or a MAC-CE) enabling the UE 115-*c* to transmit supplemental PRSs to the UE 115-*d* in a shared spectrum. At 410, the base station 105-*b* may transmit, and the UE 115-*d* may receive, a configuration message (e.g., an RRC message or a MAC-CE) enabling the UE 115-*d* to receive supplemental PRSs from the UE 115-*c* in the shared spectrum. In some cases, the configuration message at 405 and the configuration message at 410 may be the same. The configuration message may include an indication of a frequency location, frequency bandwidth, or a time window of the supplemental PRSs. The configuration message may also indicate whether phase continuity is maintained between the supplemental PRSs and regular PRSs (e.g., PRSs in an unshared spectrum) and physical parameters related to the supplementary PRSs.

In some aspects, rather than the base station 105-*b* transmitting, and the UE 115-*d* receiving, the PRS configuration at 410, the UE 115-*c* may receive the PRS configuration from the base station 105-*b* at 405, and, at 415, the UE 115-*c* may transmit, and the UE 115-*d* may receive, the PRS configuration message (e.g., a sidelink control information (SCI) message) enabling the UE 115-*d* to receive supplemental PRSs from the UE 115-*c* in the shared spectrum. Additionally, or alternatively, the UE 115-*c* may manage configurations for supplemental PRSs (e.g., without the involvement of the base station 105-*b*). In such aspects, the UE 115-*c* may receive the PRS configuration, at a lower layer at the UE 115-*c* from an upper layer at the UE 115-*c*, and the UE 115-*c* may transmit the PRS configuration to the UE 115-*d* (e.g., an SCI message) enabling the UE 115-*d* to receive supplemental PRSs from the UE 115-*c* in the shared spectrum.

In any case, the UE 115-*c* may determine to transmit a first set of one or more PRSs in an unshared spectrum and a second, supplemental set of one or more PRSs in a shared spectrum. In some cases, the UE 115-*c* may determine to transmit the second, supplementary set of one or more PRSs based on a QoS requirement for positioning, a load or congestion level of PRSs, or both. At 420, the UE 115-*c* may then perform a channel access procedure on the shared spectrum to transmit the second, supplementary set of one or more PRSs based on the determining.

At 425, the UE 115-*c* may transmit, and the UE 115-*d* may receive, the first set of one or more PRSs in the unshared spectrum, and, at 430, the UE 115-*c* may transmit, and the UE 115-*d* may receive, the second, supplementary set of one or more PRSs in the shared spectrum (e.g., if the channel access procedure at 420 is successful or passes). In some cases, the UE 115-c may transmit, and the UE 115-d may receive, the first set of one or more PRSs and the second, supplementary set of one or more PRSs separately in the unshared spectrum and the shared spectrum respectively. In other cases, the UE 115-c may transmit, and the UE 115-d may receive, the first set of one or more PRSs and the second, supplementary set of one or more PRSs in a single transmission across a bandwidth spanning the unshared spectrum and the shared spectrum.

In some aspects, the UE 115-c may identify resources for transmitting the second, supplementary set of one or more PRSs based on resources reserved for transmitting the first set of one or more PRSs, and the UE 115-c may transmit the second, supplementary set of one or more PRSs on the identified resources. For example, the UE 115-c may receive an indication of (e.g., in the PRS configuration at 405) or otherwise identify reserved resources for the first set of one or more PRSs. The UE 115-c may then identify resources on which to transmit the second, supplementary set of one or more PRSs based on (e.g., offset from) the reserved resources.

Similarly, the UE 115-d may identify the resources for receiving the second, supplementary set of one or more PRSs based on the resources reserved for receiving the first set of one or more PRSs (e.g., reserved in the PRS configuration at 410 or 415). The bandwidth, starting location, or both, of the resources for transmitting or receiving the second, supplementary set of one or more PRSs may be based on the resources reserved for transmitting or receiving the first set of one or more PRSs. In some cases, a time window for transmitting or receiving the second, supplementary set of one or more PRSs may be determined (e.g., predetermined, defined, predefined, configured, or preconfigured) at the UE 115-c and the UE 115-d.

At 435, the UE 115-c may transmit, and the UE 115-d may receive, a sidelink positioning assistance message following the PRS transmission occasion (e.g., a post-PRS configuration message) indicating whether the UE 115-c transmitted the second, supplementary set of one or more PRSs in the shared spectrum. The UE 115-c may transmit, and the UE 115-d may receive, the sidelink positioning assistance message following the PRS transmission occasion after one or more transmission occasions for transmitting or receiving the second, supplementary set of one or more PRSs. The UE 115-d may buffer signals received on resources in the shared spectrum potentially including the second, supplementary set of one or more PRSs, and the UE 115-d may decode the buffered signals to identify the second, supplementary set of one or more PRSs based on the second configuration message indicating that the UE 115-c transmitted the second, supplementary set of one or more PRSs in the shared spectrum. At 440, the UE 115-d may compute a position of the UE 115-c based on the first set of one or more PRSs and the second, supplementary set of one or more PRSs.

Figure 5:
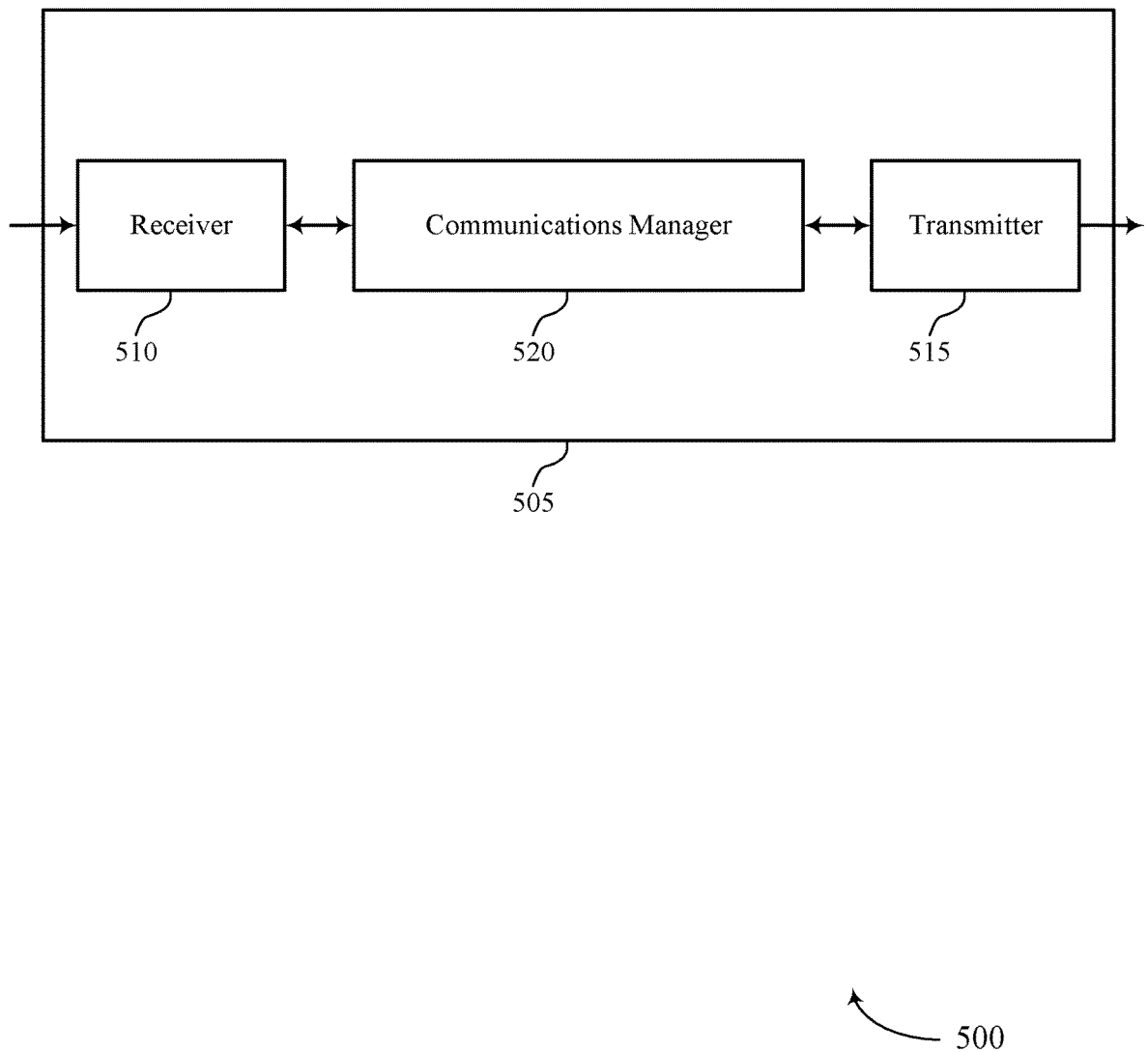
FIGS. 5 and 6 show block diagrams of devices that support supplemental PRS transmission in accordance with aspects of the present disclosure.

FIG. 5 shows a block diagram 500 of a device 505 that supports supplemental PRS transmission in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to supplemental PRS transmission). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to supplemental PRS transmission). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of supplemental PRS transmission as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for determining to transmit a first set of one or more PRSs in an unshared spectrum and a second, supplementary set of one or more PRSs in a shared spectrum. The communications manager 520 may be configured as or otherwise support a means for performing a channel access procedure on the shared spectrum to transmit the second, supplementary set of one or more PRSs based on the determining. The communications manager 520 may be configured as or otherwise support a means for transmitting, to a second UE, the first set of one or more PRSs in the unshared spectrum, the second, supplementary set of one or more PRSs in the shared spectrum, or both based on performing the channel access procedure.

Additionally, or alternatively, the communications manager 520 may support wireless communication at a first UE in accordance with examples as disclosed herein. For example, the communications manager 520 may be configured as or otherwise support a means for receiving a configuration message enabling the first UE to receive a first set of one or more PRSs from a second UE in an unshared spectrum and a second, supplementary set of one or more PRSs from the second UE in a shared spectrum. The communications manager 520 may be configured as or otherwise support a means for receiving, from the second UE, the first set of one or more PRSs in the unshared spectrum and the second, supplementary set of one or more PRSs in the shared spectrum. The communications manager 520 may be configured as or otherwise support a means for computing a position of the second UE based on the first set of one or more PRSs and the second set of one or more PRSs.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and improved positioning accuracy. In particular, a sidelink UE may be able to more accurately determine a position of another sidelink UE, resulting in, for example, reduced accidents in a wireless communications system. Further, by supporting a configuration for supplemental PRSs, transmissions of supplemental PRSs may be flexible, resulting in more efficient utilization of power and communication resources.

Figure 6:
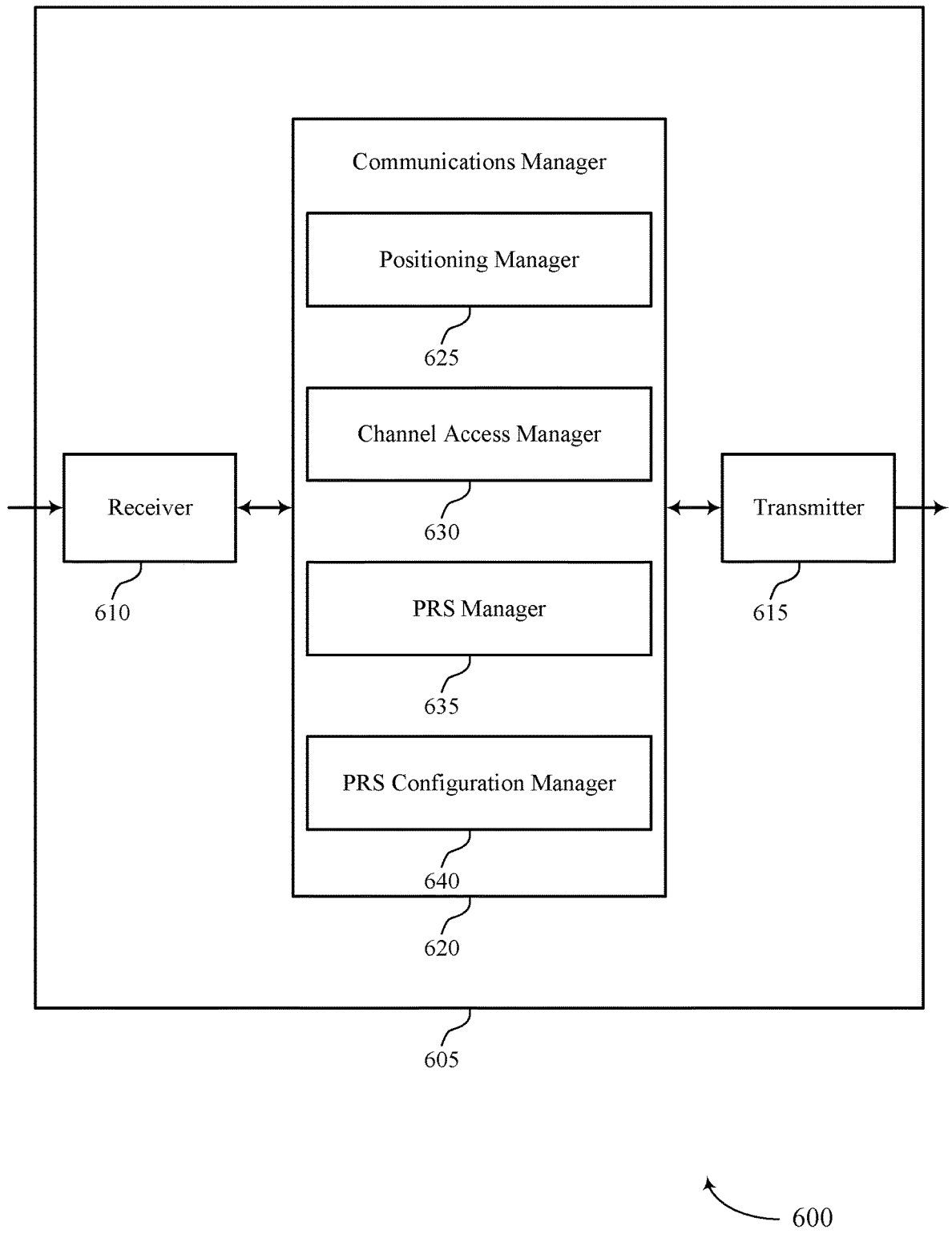

FIG. 6 shows a block diagram 600 of a device 605 that supports supplemental PRS transmission in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to supplemental PRS transmission). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to supplemental PRS transmission). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of supplemental PRS transmission as described herein. For example, the communications manager 620 may include a positioning manager 625, a channel access manager 630, an PRS manager 635, an PRS configuration manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The positioning manager 625 may be configured as or otherwise support a means for determining to transmit a first set of one or more PRSs in an unshared spectrum and a second, supplementary set of one or more PRSs in a shared spectrum. The channel access manager 630 may be configured as or otherwise support a means for performing a channel access procedure on the shared spectrum to transmit the second, supplementary set of one or more PRSs based on the determining. The PRS manager 635 may be configured as or otherwise support a means for transmitting, to a second UE, the first set of one or more PRSs in the unshared spectrum, the second, supplementary set of one or more PRSs in the shared spectrum, or both based on performing the channel access procedure.

Additionally, or alternatively, the communications manager 620 may support wireless communication at a first UE in accordance with examples as disclosed herein. The PRS configuration manager 640 may be configured as or otherwise support a means for receiving a configuration message enabling the first UE to receive a first set of one or more PRSs from a second UE in an unshared spectrum and a second, supplementary set of one or more PRSs from the second UE in a shared spectrum. The PRS manager 635 may be configured as or otherwise support a means for receiving, from the second UE, the first set of one or more PRSs in the unshared spectrum and the second, supplementary set of one or more PRSs in the shared spectrum. The positioning manager 625 may be configured as or otherwise support a means for computing a position of the second UE based on the first set of one or more PRSs and the second set of one or more PRSs.

Figure 7:
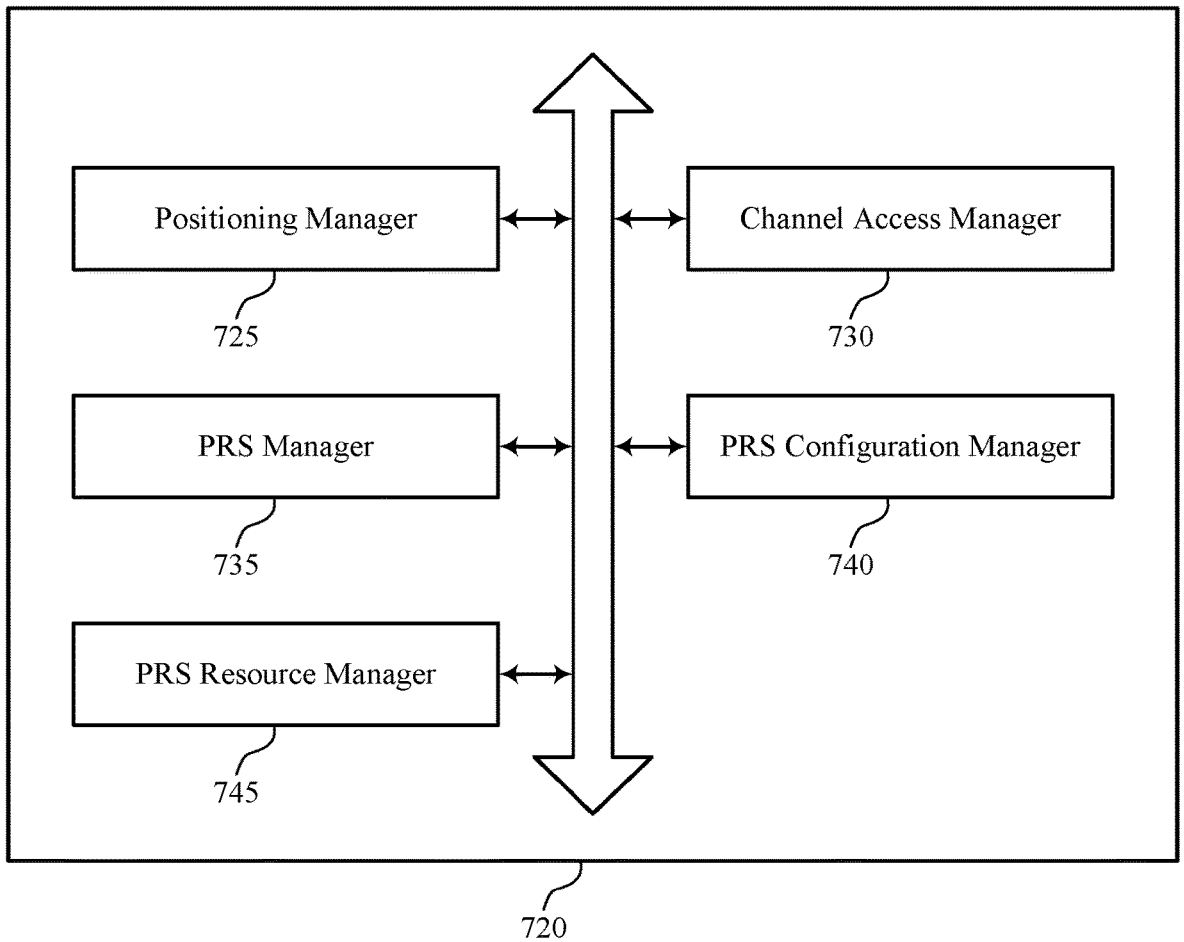
FIG. 7 shows a block diagram of a communications manager that supports supplemental PRS transmission in accordance with aspects of the present disclosure.

FIG. 7 shows a block diagram 700 of a communications manager 720 that supports supplemental PRS transmission in accordance with aspects of the present disclosure. The communications manager 720 may be an example of aspects of a communications manager 520, a communications manager 620, or both, as described herein. The communications manager 720, or various components thereof, may be an example of means for performing various aspects of supplemental PRS transmission as described herein. For example, the communications manager 720 may include a positioning manager 725, a channel access manager 730, an PRS manager 735, an PRS configuration manager 740, an PRS resource manager 745, or any combination thereof. Each of these components may communicate, directly or indirectly, with one another (e.g., via one or more buses).

The communications manager 720 may support wireless communication at a first UE in accordance with examples as disclosed herein. The positioning manager 725 may be configured as or otherwise support a means for determining to transmit a first set of one or more PRSs in an unshared spectrum and a second, supplementary set of one or more PRSs in a shared spectrum. The channel access manager 730 may be configured as or otherwise support a means for performing a channel access procedure on the shared spectrum to transmit the second, supplementary set of one or more PRSs based on the determining. The PRS manager 735 may be configured as or otherwise support a means for transmitting, to a second UE, the first set of one or more PRSs in the unshared spectrum, the second, supplementary set of one or more PRSs in the shared spectrum, or both based on performing the channel access procedure.

In some examples, the PRS configuration manager 740 may be configured as or otherwise support a means for receiving a configuration message enabling the first UE to transmit the second, supplementary set of one or more PRSs to the second UE in the shared spectrum, where the determining is based on receiving the configuration message.

In some examples, the PRS configuration manager 740 may be configured as or otherwise support a means for receiving, in the configuration message, an indication of a frequency location of the second, supplementary set of one or more PRSs, a frequency bandwidth of the second, supplementary set of one or more PRSs, a time window for the second, supplementary set of one or more PRSs, whether phase continuity is maintained between the first set of one or more PRSs and the second, supplementary set of one or more PRSs, physical parameters related to the second, supplementary set of one or more PRSs, or a combination thereof.

In some examples, the configuration message includes a RRC message or a MAC-CE.

In some examples, the PRS configuration manager 740 may be configured as or otherwise support a means for transmitting, to the second UE, a configuration message enabling the second UE to receive the second, supplementary set of one or more PRSs from the first UE in the shared spectrum.

In some examples, the PRS configuration manager 740 may be configured as or otherwise support a means for transmitting, in the configuration message, an indication of a frequency location of the second, supplementary set of one or more PRSs, a frequency bandwidth of the second, supplementary set of one or more PRSs, a time window for the second, supplementary set of one or more PRSs, whether phase continuity is maintained between the first set of one or more PRSs and the second, supplementary set of one or more PRSs, physical parameters related to the second, supplementary set of one or more PRSs, or a combination thereof.

In some examples, the configuration message includes a sidelink control information message.

In some examples, to support transmitting the second, supplementary set of one or more PRSs, the PRS resource manager 745 may be configured as or otherwise support a means for identifying resources for transmitting the second, supplementary set of one or more PRSs based on resources reserved for transmitting the first set of one or more PRSs. In some examples, to support transmitting the second, supplementary set of one or more PRSs, the PRS manager 735 may be configured as or otherwise support a means for transmitting the second, supplementary set of one or more PRSs on the identified resources.

In some examples, a bandwidth, starting location, or both of the resources for transmitting the second, supplementary set of one or more PRSs is based on the resources reserved for transmitting the first set of one or more PRSs.

In some examples, a time window for transmitting the second, supplementary set of one or more PRSs is determined at the first UE.

In some examples, the time window includes one or more transmission occasions for transmitting the second, supplementary set of one or more PRSs.

In some examples, the PRS configuration manager 740 may be configured as or otherwise support a means for transmitting, to the second UE after one or more transmission occasions for transmitting the second, supplementary set of one or more PRSs, a configuration message indicating whether the first UE transmitted the second, supplementary set of one or more PRSs in the shared spectrum.

In some examples, to support determining to transmit the second, supplementary set of one or more PRSs, the positioning manager 725 may be configured as or otherwise support a means for determining to transmit the second, supplementary set of one or more PRSs based on a quality of service requirement for positioning, a load or congestion level of PRSs, or both.

In some examples, to support transmitting the first set of one or more reference signals, the second, supplementary set of one or more PRSs or both, the PRS manager 735 may be configured as or otherwise support a means for transmitting the first set of one or more reference signals and the second, supplementary set of one or more reference signals separately in the unshared spectrum and the shared spectrum respectively.

In some examples, to support transmitting the first set of one or more reference signals, the second, supplementary set of one or more PRSs or both, the PRS manager 735 may be configured as or otherwise support a means for transmitting the first set of one or more reference signals and the second, supplementary set of one or more reference signals in a single transmission across a bandwidth spanning the unshared spectrum and the shared spectrum.

In some examples, the channel access procedure includes a category one listen-before-talk procedure, a category two listen-before-talk procedure, or a category four listen-before-talk procedure.

Additionally, or alternatively, the communications manager 720 may support wireless communication at a first UE in accordance with examples as disclosed herein. The PRS configuration manager 740 may be configured as or otherwise support a means for receiving a configuration message enabling the first UE to receive a first set of one or more PRSs from a second UE in an unshared spectrum and a second, supplementary set of one or more PRSs from the second UE in a shared spectrum. In some examples, the PRS manager 735 may be configured as or otherwise support a means for receiving, from the second UE, the first set of one or more PRSs in the unshared spectrum and the second, supplementary set of one or more PRSs in the shared spectrum. In some examples, the positioning manager 725 may be configured as or otherwise support a means for computing a position of the second UE based on the first set of one or more PRSs and the second set of one or more PRSs.

In some examples, the PRS configuration manager 740 may be configured as or otherwise support a means for receiving, in the configuration message, an indication of a frequency location of the second, supplementary set of one or more PRSs, a frequency bandwidth of the second, supplementary set of one or more PRSs, a time window for the second, supplementary set of one or more PRSs, whether phase continuity is maintained between the first set of one or more PRSs and the second, supplementary set of one or more PRSs, physical parameters related to the second, supplementary set of one or more PRSs, or a combination thereof.

In some examples, the configuration message includes a RRC message, a MAC-CE, or a sidelink control information message.

In some examples, to support receiving the second, supplementary set of one or more PRSs, the PRS resource manager 745 may be configured as or otherwise support a means for identifying resources to monitor for the second, supplementary set of one or more PRSs based on resources reserved for the first set of one or more PRSs. In some examples, to support receiving the second, supplementary set of one or more PRSs, the PRS manager 735 may be configured as or otherwise support a means for receiving the second, supplementary set of one or more PRSs on the identified resources.

In some examples, a bandwidth, starting location, or both of the resources to monitor for the second, supplementary set of one or more PRSs is based on the resources reserved for the first set of one or more PRSs.

In some examples, a time window to monitor for the second, supplementary set of one or more PRSs is determined at the first UE.

In some examples, the configuration message enabling the first UE to receive the first set of one or more PRSs and the second, and the PRS configuration manager 740 may be configured as or otherwise support a means for receiving, from the second UE after monitoring for the second, supplementary set of one or more PRSs, a second configuration message indicating whether the second UE transmitted the second, supplementary set of one or more PRSs in the shared spectrum.

In some examples, the PRS manager 735 may be configured as or otherwise support a means for buffering signals received on resources in the shared spectrum potentially including the second, supplementary set of one or more PRSs. In some examples, the PRS manager 735 may be configured as or otherwise support a means for decoding the buffered signals to identify the second, supplementary set of one or more PRSs based on the second configuration message indicating that the second UE transmitted the second, supplementary set of one or more PRSs in the shared spectrum.

In some examples, to support receiving the first set of one or more reference signals, the second, supplementary set of one or more PRSs, or both, the PRS manager 735 may be configured as or otherwise support a means for receiving the first set of one or more reference signals and the second, supplementary set of one or more reference signals separately in the unshared spectrum and the shared spectrum respectively.

In some examples, to support receiving the first set of one or more reference signals, the second, supplementary set of one or more PRSs or both, the PRS manager 735 may be configured as or otherwise support a means for receiving the first set of one or more reference signals and the second, supplementary set of one or more reference signals in a single transmission across a bandwidth spanning the unshared spectrum and the shared spectrum.

Figure 8:
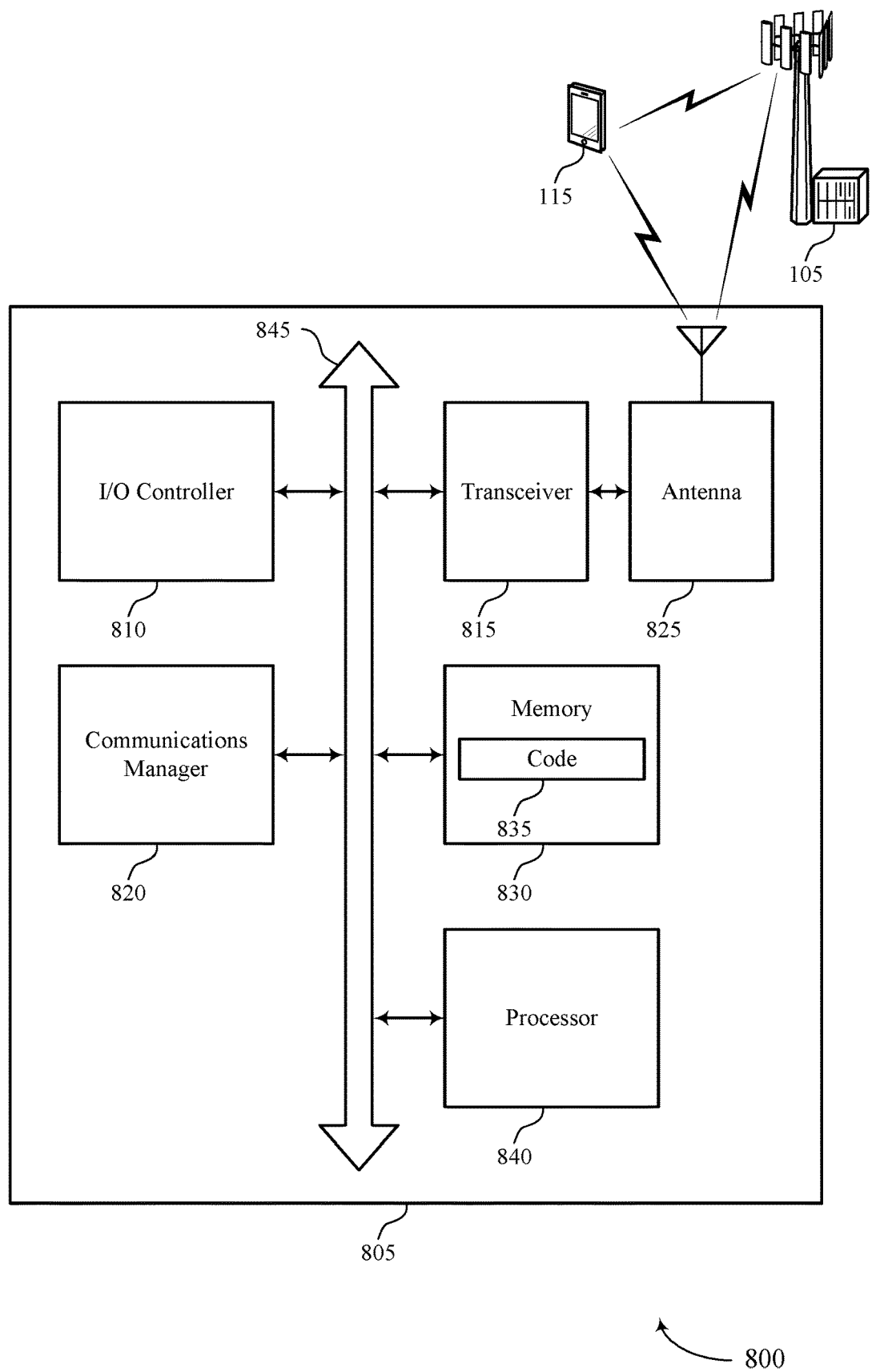
FIG. 8 shows a diagram of a system including a device that supports supplemental PRS transmission in accordance with aspects of the present disclosure.

FIG. 8 shows a diagram of a system 800 including a device 805 that supports supplemental PRS transmission in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting supplemental PRS transmission). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for determining to transmit a first set of one or more PRSs in an unshared spectrum and a second, supplementary set of one or more PRSs in a shared spectrum. The communications manager 820 may be configured as or otherwise support a means for performing a channel access procedure on the shared spectrum to transmit the second, supplementary set of one or more PRSs based on the determining. The communications manager 820 may be configured as or otherwise support a means for transmitting, to a second UE, the first set of one or more PRSs in the unshared spectrum, the second, supplementary set of one or more PRSs in the shared spectrum, or both based on performing the channel access procedure.

Additionally, or alternatively, the communications manager 820 may support wireless communication at a first UE in accordance with examples as disclosed herein. For example, the communications manager 820 may be configured as or otherwise support a means for receiving a configuration message enabling the first UE to receive a first set of one or more PRSs from a second UE in an unshared spectrum and a second, supplementary set of one or more PRSs from the second UE in a shared spectrum. The communications manager 820 may be configured as or otherwise support a means for receiving, from the second UE, the first set of one or more PRSs in the unshared spectrum and the second, supplementary set of one or more PRSs in the shared spectrum. The communications manager 820 may be configured as or otherwise support a means for computing a position of the second UE based on the first set of one or more PRSs and the second set of one or more PRSs.

By including or configuring the communications manager 820 in accordance with examples as described herein, the device 805 may support techniques for reduced power consumption and improved positioning accuracy. In particular, a sidelink UE may be able to more accurately determine a position of another sidelink UE, resulting in, for example, reduced accidents in a wireless communications system. Further, by supporting a configuration for supplemental PRSs, transmissions of supplemental PRSs may be flexible, resulting in more efficient utilization of power and communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of supplemental PRS transmission as described herein, or the processor 840 and the memory 830 may be otherwise configured to perform or support such operations.

Figure 9:
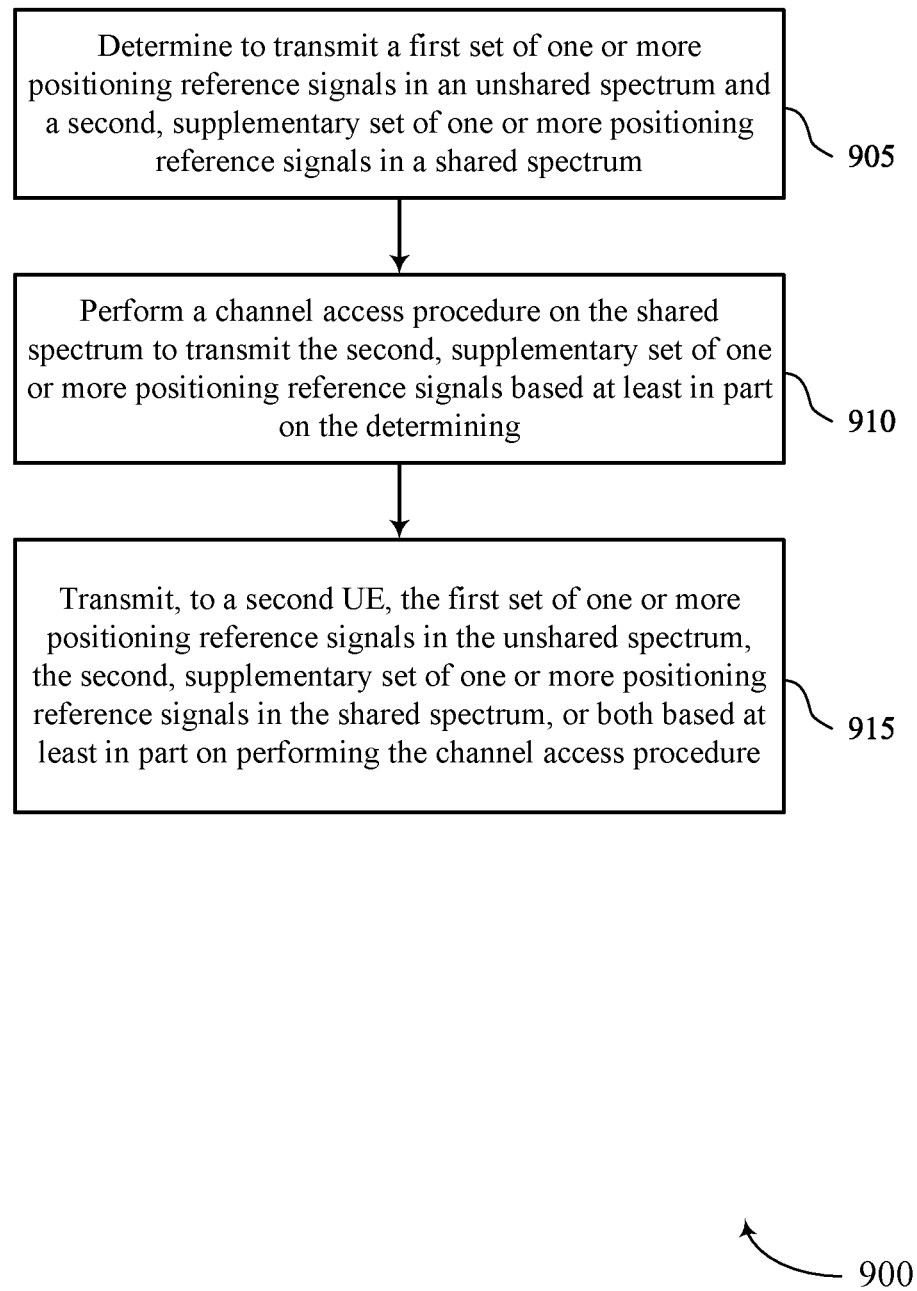
FIGS. 9 and 10 show flowcharts illustrating methods that support supplemental PRS transmission in accordance with aspects of the present disclosure.

FIG. 9 shows a flowchart illustrating a method 900 that supports supplemental PRS transmission in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include determining to transmit a first set of one or more PRSs in an unshared spectrum and a second, supplementary set of one or more PRSs in a shared spectrum. The operations of 905 may be performed in accordance with examples as disclosed herein. In some examples, aspects of the operations of 905 may be performed by a positioning manager 725 as described with reference to FIG. 7.

At 910, the method may include performing a channel access procedure on the shared spectrum to transmit the second, supplementary set of one or more PRSs based on the determining. The operations of 910 may be performed in accordance with examples as disclosed herein. In some examples, aspects of the operations of 910 may be performed by a channel access manager 730 as described with reference to FIG. 7.

At 915, the method may include transmitting, to a second UE, the first set of one or more PRSs in the unshared spectrum, the second, supplementary set of one or more PRSs in the shared spectrum, or both based on performing the channel access procedure. The operations of 915 may be performed in accordance with examples as disclosed herein. In some examples, aspects of the operations of 915 may be performed by an PRS manager 735 as described with reference to FIG. 7.

Figure 10:
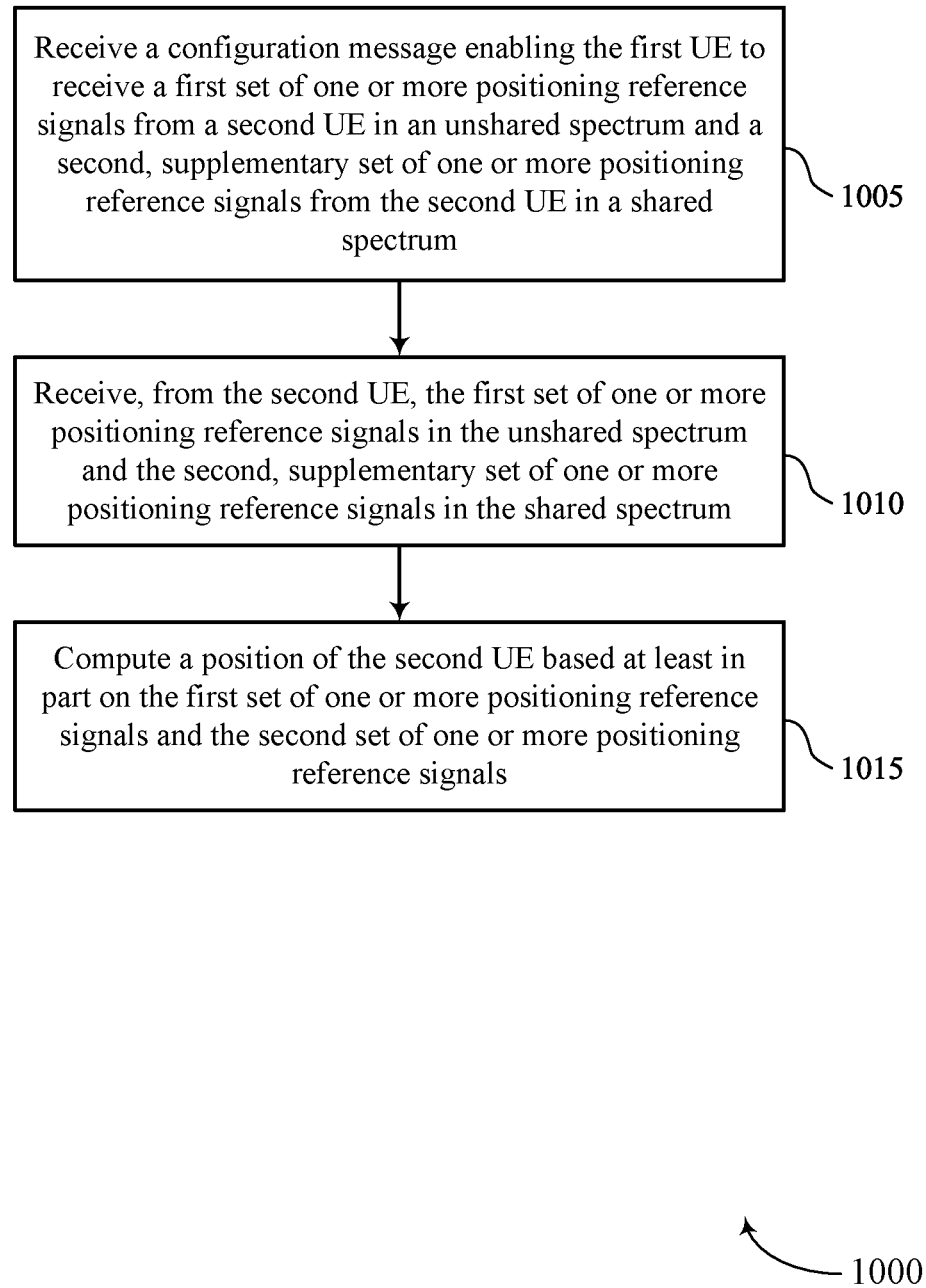

FIG. 10 shows a flowchart illustrating a method 1000 that supports supplemental PRS transmission in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving a configuration message enabling the first UE to receive a first set of one or more PRSs from a second UE in an unshared spectrum and a second, supplementary set of one or more PRSs from the second UE in a shared spectrum. The operations of 1005 may be performed in accordance with examples as disclosed herein. In some examples, aspects of the operations of 1005 may be performed by an PRS configuration manager 740 as described with reference to FIG. 7.

At 1010, the method may include receiving, from the second UE, the first set of one or more PRSs in the unshared spectrum and the second, supplementary set of one or more PRSs in the shared spectrum. The operations of 1010 may be performed in accordance with examples as disclosed herein. In some examples, aspects of the operations of 1010 may be performed by an PRS manager 735 as described with reference to FIG. 7.

At 1015, the method may include computing a position of the second UE based on the first set of one or more PRSs and the second set of one or more PRSs. The operations of 1015 may be performed in accordance with examples as disclosed herein. In some examples, aspects of the operations of 1015 may be performed by a positioning manager 725 as described with reference to FIG. 7.

The following provides an overview of aspects of the present disclosure:

Aspect 1: A method for wireless communication at a first UE, comprising: determining to transmit a first set of one or more positioning reference signals in an unshared spectrum and a second, supplementary set of one or more positioning reference signals in a shared spectrum; performing a channel access procedure on the shared spectrum to transmit the second, supplementary set of one or more positioning reference signals based at least in part on the determining; and transmitting, to a second UE, the first set of one or more positioning reference signals in the unshared spectrum, the second, supplementary set of one or more positioning reference signals in the shared spectrum, or both based at least in part on performing the channel access procedure.

Aspect 2: The method of aspect 1, further comprising: receiving a configuration message enabling the first UE to transmit the second, supplementary set of one or more positioning reference signals to the second UE in the shared spectrum, wherein the determining is based at least in part on receiving the configuration message.

Aspect 3: The method of aspect 2, further comprising: receiving, in the configuration message, an indication of a frequency location of the second, supplementary set of one or more positioning reference signals, a frequency bandwidth of the second, supplementary set of one or more positioning reference signals, a time window for the second, supplementary set of one or more positioning reference signals, whether phase continuity is maintained between the first set of one or more positioning reference signals and the second, supplementary set of one or more positioning reference signals, physical parameters related to the second, supplementary set of one or more positioning reference signals, or a combination thereof.

Aspect 4: The method of any of aspects 2 through 3, wherein the configuration message comprises a radio resource control message or a medium access control control element.

Aspect 5: The method of any of aspects 1 through 4, further comprising: transmitting, to the second UE, a configuration message enabling the second UE to receive the second, supplementary set of one or more positioning reference signals from the first UE in the shared spectrum.

Aspect 6: The method of aspect 5, further comprising: transmitting, in the configuration message, an indication of a frequency location of the second, supplementary set of one or more positioning reference signals, a frequency bandwidth of the second, supplementary set of one or more positioning reference signals, a time window for the second, supplementary set of one or more positioning reference signals, whether phase continuity is maintained between the first set of one or more positioning reference signals and the second, supplementary set of one or more positioning reference signals, physical parameters related to the second, supplementary set of one or more positioning reference signals, or a combination thereof.

Aspect 7: The method of any of aspects 5 through 6, wherein the configuration message comprises a sidelink control information message.

Aspect 8: The method of any of aspects 1 through 7, wherein transmitting the second, supplementary set of one or more positioning reference signals comprises: identifying resources for transmitting the second, supplementary set of one or more positioning reference signals based at least in part on resources reserved for transmitting the first set of one or more positioning reference signals; and transmitting the second, supplementary set of one or more positioning reference signals on the identified resources.

Aspect 9: The method of aspect 8, wherein a bandwidth, starting location, or both of the resources for transmitting the second, supplementary set of one or more positioning reference signals is based at least in part on the resources reserved for transmitting the first set of one or more positioning reference signals.

Aspect 10: The method of any of aspects 8 through 9, wherein a time window for transmitting the second, supplementary set of one or more positioning reference signals is determined at the first UE.

Aspect 11: The method of aspect 10, wherein the time window comprises one or more transmission occasions for transmitting the second, supplementary set of one or more positioning reference signals.

Aspect 12: The method of any of aspects 1 through 11, further comprising: transmitting, to the second UE after one or more transmission occasions for transmitting the second, supplementary set of one or more positioning reference signals, a configuration message indicating whether the first UE transmitted the second, supplementary set of one or more positioning reference signals in the shared spectrum.

Aspect 13: The method of any of aspects 1 through 12, wherein determining to transmit the second, supplementary set of one or more positioning reference signals comprises: determining to transmit the second, supplementary set of one or more positioning reference signals based at least in part on a quality of service requirement for positioning, a load or congestion level of positioning reference signals, or both.

Aspect 14: The method of any of aspects 1 through 13, wherein transmitting the first set of one or more reference signals, the second, supplementary set of one or more positioning reference signals or both comprises: transmitting the first set of one or more reference signals and the second, supplementary set of one or more reference signals separately in the unshared spectrum and the shared spectrum respectively.

Aspect 15: The method of any of aspects 1 through 14, wherein transmitting the first set of one or more reference signals, the second, supplementary set of one or more positioning reference signals or both comprises: transmitting the first set of one or more reference signals and the second, supplementary set of one or more reference signals in a single transmission across a bandwidth spanning the unshared spectrum and the shared spectrum.

Aspect 16: The method of any of aspects 1 through 15, wherein the channel access procedure comprises a category one listen-before-talk procedure, a category two listen-before-talk procedure, or a category four listen-before-talk procedure.

Aspect 17: A method for wireless communication at a first UE, comprising: receiving a configuration message enabling the first UE to receive a first set of one or more positioning reference signals from a second UE in an unshared spectrum and a second, supplementary set of one or more positioning reference signals from the second UE in a shared spectrum; receiving, from the second UE, the first set of one or more positioning reference signals in the unshared spectrum and the second, supplementary set of one or more positioning reference signals in the shared spectrum; and computing a position of the second UE based at least in part on the first set of one or more positioning reference signals and the second set of one or more positioning reference signals.

Aspect 18: The method of aspect 17, further comprising: receiving, in the configuration message, an indication of a frequency location of the second, supplementary set of one or more positioning reference signals, a frequency bandwidth of the second, supplementary set of one or more positioning reference signals, a time window for the second, supplementary set of one or more positioning reference signals, whether phase continuity is maintained between the first set of one or more positioning reference signals and the second, supplementary set of one or more positioning reference signals, physical parameters related to the second, supplementary set of one or more positioning reference signals, or a combination thereof.

Aspect 19: The method of aspect 18, wherein the configuration message comprises a radio resource control message, a medium access control control element, or a sidelink control information message.

Aspect 20: The method of any of aspects 17 through 19, wherein receiving the second, supplementary set of one or more positioning reference signals comprises: identifying resources to monitor for the second, supplementary set of one or more positioning reference signals based at least in part on resources reserved for the first set of one or more positioning reference signals; and receiving the second, supplementary set of one or more positioning reference signals on the identified resources.

Aspect 21: The method of aspect 20, wherein a bandwidth, starting location, or both of the resources to monitor for the second, supplementary set of one or more positioning reference signals is based at least in part on the resources reserved for the first set of one or more positioning reference signals.

Aspect 22: The method of any of aspects 20 through 21, wherein a time window to monitor for the second, supplementary set of one or more positioning reference signals is determined at the first UE.

Aspect 23: The method of any of aspects 17 through 22, wherein the configuration message enabling the first UE to receive the first set of one or more positioning reference signals and the second, supplementary set of one or more positioning reference signals comprises a first configuration message, the method further comprising: receiving, from the second UE after monitoring for the second, supplementary set of one or more positioning reference signals, a second configuration message indicating whether the second UE transmitted the second, supplementary set of one or more positioning reference signals in the shared spectrum.

Aspect 24: The method of aspect 23, further comprising: buffering signals received on resources in the shared spectrum potentially including the second, supplementary set of one or more positioning reference signals; and decoding the buffered signals to identify the second, supplementary set of one or more positioning reference signals based at least in part on the second configuration message indicating that the second UE transmitted the second, supplementary set of one or more positioning reference signals in the shared spectrum.

Aspect 25: The method of any of aspects 17 through 24, wherein receiving the first set of one or more reference signals, the second, supplementary set of one or more positioning reference signals, or both comprises: receiving the first set of one or more reference signals and the second, supplementary set of one or more reference signals separately in the unshared spectrum and the shared spectrum respectively.

Aspect 26: The method of any of aspects 17 through 25, wherein receiving the first set of one or more reference signals, the second, supplementary set of one or more positioning reference signals or both comprises: receiving the first set of one or more reference signals and the second, supplementary set of one or more reference signals in a single transmission across a bandwidth spanning the unshared spectrum and the shared spectrum.

Aspect 27: An apparatus for wireless communication at a first UE, comprising a processor; memory coupled with the processor; and instructions stored in the memory and executable by the processor to cause the apparatus to perform a method of any of aspects 1 through 16.

Aspect 28: An apparatus for wireless communication at a first UE, comprising at least one means for performing a method of any of aspects 1 through 16.

Aspect 29: A non-transitory computer-readable medium storing code for wireless communication at a first UE, the code comprising instructions executable by a processor to perform a method of any of aspects 1 through 16.

Aspect 30: An apparatus for wireless communication at a first UE, comprising a processor; memory coupled with the processor; and instructions stored in the memory and executable by the processor to cause the apparatus to perform a method of any of aspects 17 through 26.

Aspect 31: An apparatus for wireless communication at a first UE, comprising at least one means for performing a method of any of aspects 17 through 26.

Aspect 32: A non-transitory computer-readable medium storing code for wireless communication at a first UE, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
 a processor;
 memory coupled with the processor; and
 instructions stored in the memory and executable by the processor to cause the apparatus to:
 determine to transmit a first set of one or more positioning reference signals in an unshared spectrum and a second, supplementary set of one or more positioning reference signals in a shared spectrum;
 perform a channel access procedure on the shared spectrum to transmit the second, supplementary set of one or more positioning reference signals based at least in part on the determining; and
 transmit, to a second UE, the first set of one or more positioning reference signals and the second, supplementary set of one or more positioning reference signals separately in the unshared spectrum and the shared spectrum respectively, or both based at least in part on performing the channel access procedure.

2. The apparatus of claim 1, wherein the instructions are further executable by the processor to cause the apparatus to:
receive a configuration message enabling the first UE to transmit the second, supplementary set of one or more positioning reference signals to the second UE in the shared spectrum, wherein the determining is based at least in part on receiving the configuration message.

3. The apparatus of claim 2, wherein the instructions are further executable by the processor to cause the apparatus to:
receive, in the configuration message, an indication of a frequency location of the second, supplementary set of one or more positioning reference signals, a frequency bandwidth of the second, supplementary set of one or more positioning reference signals, a time window for the second, supplementary set of one or more positioning reference signals, whether phase continuity is maintained between the first set of one or more positioning reference signals and the second, supplementary set of one or more positioning reference signals, physical parameters related to the second, supplementary set of one or more positioning reference signals, or a combination thereof.

4. The apparatus of claim 2, wherein the configuration message comprises a radio resource control message or a medium access control control element.

5. The apparatus of claim 1, wherein the instructions are further executable by the processor to cause the apparatus to:
transmit, to the second UE, a configuration message enabling the second UE to receive the second, supplementary set of one or more positioning reference signals from the first UE in the shared spectrum.

6. The apparatus of claim 5, wherein the instructions are further executable by the processor to cause the apparatus to:
transmit, in the configuration message, an indication of a frequency location of the second, supplementary set of one or more positioning reference signals, a frequency bandwidth of the second, supplementary set of one or more positioning reference signals, a time window for the second, supplementary set of one or more positioning reference signals, whether phase continuity is maintained between the first set of one or more positioning reference signals and the second, supplementary set of one or more positioning reference signals, physical parameters related to the second, supplementary set of one or more positioning reference signals, or a combination thereof.

7. The apparatus of claim 5, wherein the configuration message comprises a sidelink control information message.

8. The apparatus of claim 1, wherein the instructions to transmit the second, supplementary set of one or more positioning reference signals are executable by the processor to cause the apparatus to:
identify resources for transmitting the second, supplementary set of one or more positioning reference signals based at least in part on resources reserved for transmitting the first set of one or more positioning reference signals; and
transmit the second, supplementary set of one or more positioning reference signals on the identified resources.

9. The apparatus of claim 8, wherein a bandwidth, starting location, or both of the resources for transmitting the second, supplementary set of one or more positioning reference signals is based at least in part on the resources reserved for transmitting the first set of one or more positioning reference signals.

10. The apparatus of claim 8, wherein a time window for transmitting the second, supplementary set of one or more positioning reference signals is determined at the first UE.

11. The apparatus of claim 10, wherein the time window comprises one or more transmission occasions for transmitting the second, supplementary set of one or more positioning reference signals.

12. The apparatus of claim 1, wherein the instructions are further executable by the processor to cause the apparatus to:
transmit, to the second UE after one or more transmission occasions for transmitting the second, supplementary set of one or more positioning reference signals, a configuration message indicating whether the first UE transmitted the second, supplementary set of one or more positioning reference signals in the shared spectrum.

13. The apparatus of claim 1, wherein the instructions to determine to transmit the second, supplementary set of one or more positioning reference signals are executable by the processor to cause the apparatus to:
determine to transmit the second, supplementary set of one or more positioning reference signals based at least in part on a quality of service requirement for positioning, a load or congestion level of positioning reference signals, or both.

14. The apparatus of claim 1, wherein the instructions to transmit the first set of one or more reference signals, the second, supplementary set of one or more positioning reference signals or both are executable by the processor to cause the apparatus to:
transmit the first set of one or more reference signals and the second, supplementary set of one or more reference signals in a single transmission across a bandwidth spanning the unshared spectrum and the shared spectrum.

15. The apparatus of claim 1, wherein the channel access procedure comprises a category one listen-before-talk procedure, a category two listen-before-talk procedure, or a category four listen-before-talk procedure.

16. An apparatus for wireless communication at a first user equipment (UE), comprising:
a processor;
memory coupled with the processor; and
instructions stored in the memory and executable by the processor to cause the apparatus to:
receive a configuration message enabling the first UE to receive a first set of one or more positioning reference signals from a second UE in an unshared spectrum and a second, supplementary set of one or more positioning reference signals from the second UE in a shared spectrum;
receive, from the second UE, the first set of one or more positioning reference signals and the second, supplementary set of one or more positioning reference signals separately in the unshared spectrum and the shared spectrum respectively; and
compute a position of the second UE based at least in part on the first set of one or more positioning reference signals and the second set of one or more positioning reference signals.

17. The apparatus of claim 16, wherein the instructions are further executable by the processor to cause the apparatus to:

receive, in the configuration message, an indication of a frequency location of the second, supplementary set of one or more positioning reference signals, a frequency bandwidth of the second, supplementary set of one or more positioning reference signals, a time window for the second, supplementary set of one or more positioning reference signals, whether phase continuity is maintained between the first set of one or more positioning reference signals and the second, supplementary set of one or more positioning reference signals, physical parameters related to the second, supplementary set of one or more positioning reference signals, or a combination thereof.

18. The apparatus of claim 17, wherein the configuration message comprises a radio resource control message, a medium access control control element, or a sidelink control information message.

19. The apparatus of claim 16, wherein the instructions to receive the second, supplementary set of one or more positioning reference signals are executable by the processor to cause the apparatus to:
identify resources to monitor for the second, supplementary set of one or more positioning reference signals based at least in part on resources reserved for the first set of one or more positioning reference signals; and
receive the second, supplementary set of one or more positioning reference signals on the identified resources.

20. The apparatus of claim 19, wherein a bandwidth, starting location, or both of the resources to monitor for the second, supplementary set of one or more positioning reference signals is based at least in part on the resources reserved for the first set of one or more positioning reference signals.

21. The apparatus of claim 19, wherein a time window to monitor for the second, supplementary set of one or more positioning reference signals is determined at the first UE.

22. The apparatus of claim 16, wherein the configuration message enabling the first UE to receive the first set of one or more positioning reference signals and the second, and the instructions are further executable by the processor to cause the apparatus to:
receive, from the second UE after monitoring for the second, supplementary set of one or more positioning reference signals, a second configuration message indicating whether the second UE transmitted the second, supplementary set of one or more positioning reference signals in the shared spectrum.

23. The apparatus of claim 22, wherein the instructions are further executable by the processor to cause the apparatus to:
buffering signals receive on resources in the shared spectrum potentially including the second, supplementary set of one or more positioning reference signals; and
decode the buffered signals to identify the second, supplementary set of one or more positioning reference signals based at least in part on the second configuration message indicating that the second UE transmitted the second, supplementary set of one or more positioning reference signals in the shared spectrum.

24. The apparatus of claim 16, wherein the instructions to receive the first set of one or more reference signals, the second, supplementary set of one or more positioning reference signals or both are executable by the processor to cause the apparatus to:
receive the first set of one or more reference signals and the second, supplementary set of one or more reference signals in a single transmission across a bandwidth spanning the unshared spectrum and the shared spectrum.

25. A method for wireless communication at a first user equipment (UE), comprising:
determining to transmit a first set of one or more positioning reference signals in an unshared spectrum and a second, supplementary set of one or more positioning reference signals in a shared spectrum;
performing a channel access procedure on the shared spectrum to transmit the second, supplementary set of one or more positioning reference signals based at least in part on the determining; and
transmitting, to a second UE, the first set of one or more positioning reference signals and the second, supplementary set of one or more positioning reference signals separately in the unshared spectrum and the shared spectrum respectively, or both based at least in part on performing the channel access procedure.

26. The method of claim 25, further comprising:
receiving a configuration message enabling the first UE to transmit the second, supplementary set of one or more positioning reference signals to the second UE in the shared spectrum, wherein the determining is based at least in part on receiving the configuration message.

27. A method for wireless communication at a first user equipment (UE), comprising:
receiving a configuration message enabling the first UE to receive a first set of one or more positioning reference signals from a second UE in an unshared spectrum and a second, supplementary set of one or more positioning reference signals from the second UE in a shared spectrum;
receiving, from the second UE, the first set of one or more positioning reference signals and the second, supplementary set of one or more positioning reference signals separately in the unshared spectrum and the shared spectrum respectively; and
computing a position of the second UE based at least in part on the first set of one or more positioning reference signals and the second set of one or more positioning reference signals.

28. The method of claim 27, further comprising:
receiving, in the configuration message, an indication of a frequency location of the second, supplementary set of one or more positioning reference signals, a frequency bandwidth of the second, supplementary set of one or more positioning reference signals, a time window for the second, supplementary set of one or more positioning reference signals, whether phase continuity is maintained between the first set of one or more positioning reference signals and the second, supplementary set of one or more positioning reference signals, physical parameters related to the second, supplementary set of one or more positioning reference signals, or a combination thereof.

* * * * *